United States Patent
Nakazawa et al.

(10) Patent No.: US 6,914,715 B2
(45) Date of Patent: Jul. 5, 2005

(54) OPTICAL ELEMENT

(75) Inventors: Tatsuhiro Nakazawa, Osaka (JP); Shigeo Kittaka, Osaka (JP); Kazuaki Oya, Osaka (JP); Keiji Tsunetomo, Osaka (JP); Masatoshi Nara, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/375,099

(22) Filed: Feb. 28, 2003

(65) Prior Publication Data

US 2003/0223117 A1 Dec. 4, 2003

(30) Foreign Application Priority Data

Mar. 6, 2002 (JP) ..................................... P2002-060823

(51) Int. Cl.⁷ .............................. G02F 1/00; G02B 6/26; G02B 6/10
(52) U.S. Cl. ........................... 359/321; 385/31; 385/131
(58) Field of Search ................................ 359/237–238, 359/245, 247, 248, 321, 322; 385/24, 31, 125, 131; 343/772, 786, 909; 250/214.1; 438/690–692

(56) References Cited

U.S. PATENT DOCUMENTS

| | | | |
|---|---|---|---|
| 6,591,035 B2 * | 7/2003 | Miller et al. | 385/24 |
| 2001/0012149 A1 * | 8/2001 | Lin et al. | 359/344 |
| 2002/0002473 A1 | 1/2002 | Kittaka et al. | |
| 2002/0027655 A1 | 3/2002 | Kittaka et al. | |
| 2002/0088929 A1 | 7/2002 | Kittaka et al. | |
| 2002/0122613 A1 | 9/2002 | Kittaka et al. | |
| 2002/0197042 A1 | 12/2002 | Kittaka et al. | |
| 2003/0142385 A1 | 7/2003 | Kittaka et al. | |
| 2003/0174402 A1 | 9/2003 | Kittaka et al. | |

FOREIGN PATENT DOCUMENTS

| | | | |
|---|---|---|---|
| EP | 1 248 123 A2 | 10/2002 | |
| JP | 2001-13439 | * | 1/2001 |
| JP | 2001013439 | | 1/2001 |

OTHER PUBLICATIONS

British Search Report dated Jul. 7, 2003.
Kosaka, H., et al., "Superprism Phenomena in Photonic Crystals", Physical Review B, vol. 58, No. 16, 4 pgs (1998).
Joannopoulos, J.D., et al., "Computing Photonic Band Structures" Photonic Crystals—Molding the Flow of Light, Appendix D, pp 127–129 (1995).
Plihal, M., et al., "Photonic band structure of two–dimensional systems: The triangular lattice", Physical Review B, vol. 44, No. 16, pp 8565–8571 (1991).

* cited by examiner

Primary Examiner—Georgia Epps
Assistant Examiner—William Choi
(74) Attorney, Agent, or Firm—Whitham, Curtis & Christofferson, PC

(57) ABSTRACT

An optical element according to the invention uses a thin film-like two-dimensional photonic crystal having a structure of periodic repetition in two directions perpendicular to each other. When the two periodic directions are Y-axis and Z-axis directions, opposite surfaces of the photonic crystal structure perpendicular to the Z-axis direction and parallel to the Y-axis direction are used as a light input surface and a light output surface respectively. The direction of movement of light rays incident onto the light input surface is decided so that it is parallel to the YZ plane and inclined at a predetermined inclination angle to the Z-axis direction.

9 Claims, 24 Drawing Sheets

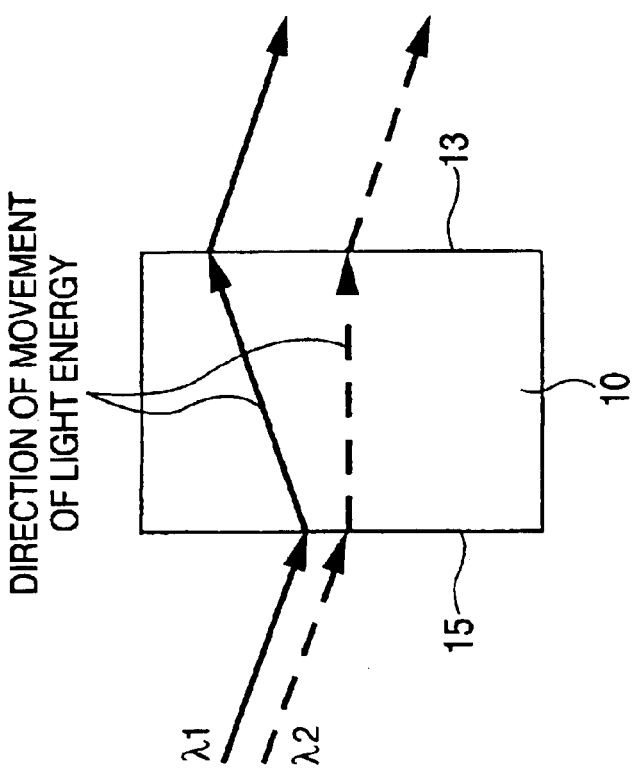
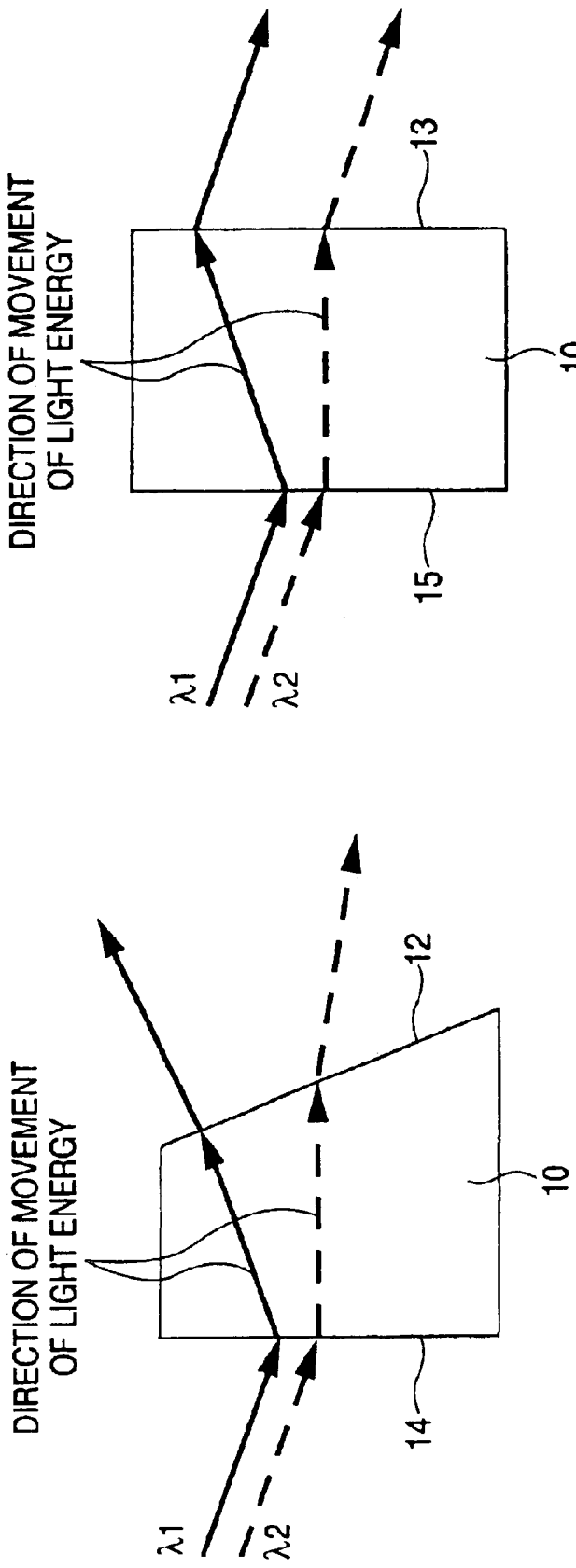

OPTICAL ELEMENT

BACKGROUND OF THE INVENTION

The present invention relates to spectroscopic optical elements for separating light by different wavelengths and particularly to these optical elements using two-dimensional or three-dimensional periodic structures.

Increase in capacity of an optical fiber communication network has been demanded intensely with the rapid advance of popularization of the Internet in recent years. Development of wavelength division multiplexing (WDM) optical communication as a means for increasing the capacity has been advanced rapidly. In WDM optical communication, optically functional elements such as an optical demultiplexer, a filter and an isolator excellent in wavelength selectivity are required because various kinds of information are transmitted individually by light having slightly different wavelengths. It is a matter of course that mass production, miniaturization, integration, stability, etc. are strongly required of the functional elements.

An optical demultiplexer (or a spectroscopic device) is used for demultiplexing/detecting an optical signal multiplexed with a plurality of wavelengths artificially as in wavelength division multiplexing optical communication or for spectrally analyzing target light as in spectrometry. The optical demultiplexer needs spectroscopic elements such as a prism, a wavelength filter, and a diffraction grating. Particularly, the diffraction grating is a typical spectroscopic element. For example, a quartz or silicon substrate having a periodic micro prismatic structure formed in its surface is used as the diffraction grating. Diffracted light rays generated by the periodic micro prismatic structure interfere with one another, so that light having a specific wavelength emerges in a specific direction. This property is used for the spectroscopic element.

FIG. 23 shows an example of a spectroscopic optical system using a diffraction grating. Wavelength-multiplexed light rays 30 output from an optical fiber 21 are collimated to parallel light rays 31 by a collimator lens 22. The parallel light rays 31 are input into a diffraction grating 23 and output at output angles different in accordance with the wavelengths. The output light rays 32 pass through the collimator lens 22 again, so that a group of convergent light spots 40 are formed on an acceptance surface 24. If photo detectors such as photo diodes or end surfaces of optical fibers are disposed as acceptance units in the positions of the convergent light spots respectively, signal outputs separated by predetermined wavelengths can be obtained. In addition, if light input into the diffraction grating has a continuous spectrum, outputs spectrally discrete in accordance with the pitch of the acceptance units disposed on the acceptance surface can be obtained.

A reflection diffraction grating satisfies the expression (1):

$$\sin \theta i + \sin \theta_o = m\lambda/d \quad (1)$$

in which m is the order of diffraction of the diffraction grating, d is a grating constant, $\lambda$ is a wavelength used, $\theta i$ is the angle between input light (an optical axis 5 of an optical fiber) and a line normal to the surface in which the diffraction grating is formed, and $\theta_o$ is the angle between output light and the normal line.

When the wavelength $\lambda$ is changed by $\Delta\lambda$ while $\theta i$ is kept constant, the positional change $\Delta x$ of each light ray which reaches the acceptance surface, which is separated by a distance L from the diffraction grating is given by the following expression.

$$\Delta x = \{Lm/(d \cdot \cos \theta_o)\} \cdot \Delta\lambda \quad (2)$$

Accordingly, signals separated by wavelengths can be obtained if the acceptance units are arranged on the acceptance surface at intervals of a positional pitch calculated in accordance with a wavelength pitch by the aforementioned expression.

An output angle from the diffraction grating, however, has little dependence on wavelength. Assume the case where light, for example, having wavelengths arranged at intervals of 0.8 nm (equivalent to a frequency pitch of 100 GHz) in a 1.55 $\mu$m-wavelength band used in optical communication needs to be demultiplexed. When the order m of diffraction is 25 in the condition that the input angle $\theta i$ is 71.5° whereas the output angle $\theta_o$ is 38.5°, the grating constant d of the diffraction grating is 24.7 $\mu$m on the basis of the expression (1). The change of the output angle obtained in accordance with the wavelength pitch of 0.8 nm in this system is only about 0.06°. If the light needs to be separably accepted by acceptance elements arranged at intervals of 50 $\mu$m, a distance L of 48 mm is required on the basis of the expression (2).

That is, generally, the positional change $\Delta x$ of each light spot on the acceptance surface needs to be not smaller than the order of tens of $\mu$m because each acceptance unit has a predetermined size. Because m and d which are constants of the diffraction grating cannot be changed significantly, the distance L needs to be made large in order to obtain a necessary value of $\Delta x$ in accordance with a small wavelength change $\Delta\lambda$. Hence, there is a problem that device size cannot but become large in order to improve the performance of the optical demultiplexer using the diffraction grating.

A two-dimensional or three-dimensional photonic crystal has been proposed as an element larger in wavelength dispersion than the diffraction grating. As will be described later, the direction of movement of light rays incident onto the two-dimensional photonic crystal is decided by a unique photonic band structure, so that very large angular dispersion can be generated even in a small wavelength difference as shown in FIG. 24A (so-called super-prism effect) The super-prism effect has been reported in the following paper.

Physical Review B, Vol.58, No.16, p.R10096, 1998

In the case of the two-dimensional photonic crystal 10, it is said that a light output surface 12 needs to be processed to have a suitable angle to form a prism as shown in FIG. 24A so that light flux largely dispersed in the inside can be taken out and used. This is because the angular dispersion effect is canceled by the light output surface 13 if the light input surface 15 is parallel to the light output surface 13 as shown in FIG. 24B as long as a means for taking out light while changing the direction of dispersed light by using a refracting phenomenon is used in the same manner as a related-art prism.

In the process for making the output surface obliquely to obtain a prism shape, the photonic crystal however must be sufficiently thick. There is also a disadvantage in terms of productivity because a high-grade processing technique is required. Moreover, in such a prism-shaped optical element, the diameter of light flux needs to be increased to a certain degree. An element having a size corresponding to the diameter of light flux is required. In the existing situation, however, a large two-dimensional photonic crystal (e.g., not smaller than 1 mm on a side) is of no practical use in terms of absorption and scattering in the inside as well as it is very difficult to produce such a large two-dimensional photonic crystal. On the other hand, if light flux is narrowed, the required size of the photonic crystal can be reduced. In this case, there is however a problem that wavelength resolving power is lowered because the light flux is spread by diffraction.

SUMMARY OF THE INVENTION

In order to solve the problem, an object of the invention is to provide a spectroscopic element having large wavelength dispersion characteristic by using a thin film-like two-dimensional photonic crystal having a light input surface and a light output surface parallel to the light input surface.

To solve the problem, an optical element according to the invention uses a thin film-like two-dimensional photonic crystal having a structure of periodic repetition in two directions perpendicular to each other. Assume now that a three-dimensional orthogonal coordinate system is defined to have the two periodic directions as Y-axis and Z-axis directions, and the other direction as an X-axis direction.

The optical element according to the invention is constituted by such a two-dimensional photonic crystal structure, wherein: two opposite surfaces of the photonic crystal structure which are perpendicular to the Z-axis direction and parallel to the Y-axis direction are used as a light input surface and a light output surface respectively; and the direction of movement of light rays incident onto the light input surface is parallel to a YZ plane containing the Y and Z axes and inclined at a predetermined inclination angle to the Z-axis direction.

Wave number vectors belonging to photonic bands according to the direction and frequency of input light are present in the two-dimensional photonic crystal structure. Preferably, at least one of the wave number vectors forms an angle of not larger than 30° with respect to a line normal to the light input surface. Preferably, the lowest photonic band is not present in the two-dimensional photonic crystal structure. Preferably, only one photonic band is present in the two-dimensional photonic crystal structure.

Preferably, the inclination angle of the input light is in a range of from 40° to 70°, both inclusively. Preferably, the ratio $a_2/\lambda_0$ of a period $a_2$ structurally repeated in the Z-axis direction to the wavelength $\lambda_0$ of input light in a vacuum is in a range of from 0.3 to 1.5, both inclusively.

Preferably, the ratio of the maximum refractive index to the minimum refractive index between a plurality of substances constituting the two-dimensional photonic crystal structure in the wavelength $\lambda_0$ of input light is in a range of from 1.2 to 5.0, respectively. Preferably, one kind of the plurality of substances constituting the periodic structure portion of the two-dimensional photonic crystal structure is air or vacuum.

Preferably, the number of periods in the Z-axis direction in the two-dimensional photonic crystal structure is in a range of from 3 to 20, both inclusively.

The two-dimensional photonic crystal structure according to the invention is made of a periodic multilayer film formed on a surface of a parallel plane substrate. Parallel grooves each having a predetermined width are formed in the multilayer film so that the parallel grooves are disposed at regular intervals.

According to the invention, there can be provided a spectroscopic device including: an optical element constituted by a multilayer structure defined above; a unit for inputting multiplexed light flux with a plurality of wavelengths into an end surface of a periodic structural portion of the multilayer structure; and a unit for detecting light rays output from the light output surface of the multilayer structure at angles different in accordance with the wavelengths.

The present disclosure relates to the subject matter contained in Japanese patent application No. P2002-060823 (filed on Mar. 6, 2002), which is expressly incorporated herein by reference in its entirety.

BRIEF DESCRIPTION OF THE DRAWINGS

FIG. 24A is a typical view of demultiplexing by a two-dimensional photonic crystal in the case where an obliquely cutting process is applied to the photonic crystal; and FIG. 24B is a typical view of demultiplexing by a two-dimensional photonic crystal in the case where the obliquely cutting process is not applied to the photonic crystal.

DESCRIPTION OF THE PREFERRED EMBODIMENT

The invention has been attained as a result of the inventors' research to develop an optical element making good use of unique propagation characteristic of a photonic crystal so as to solve the foregoing problem. In the invention, the process for making a surface obliquely is not required because the two-dimensional photonic crystal used has an input surface and an output surface parallel to the input surface. Moreover, because a thin film-like photonic crystal is used, an optical element having a large area can be produced easily and can meet light flux having a large diameter. In addition, absorption and scattering in the inside of the photonic crystal can be suppressed.

In the invention, in the condition that light is input into an incident end surface of the photonic crystal not perpendicularly but at a certain angle, band characteristic concerning propagation in the photonic crystal is selected to obtain wavelength dispersion about twice as much as that obtained by a general diffraction grating. That is, highly dispersed light can be taken out from a photonic crystal having a parallel plane structure which is simpler.

The point of difference of the invention from the related art shown in FIG. 24B is that a diffraction phenomenon caused by a unique electric field distribution due to high-order band light is used in the invention in place of a so-called refraction phenomenon of directly taking out propagated light exhibiting large wavelength dispersion in the photonic crystal.

The configuration of the invention will be described below specifically.

Figure 1:
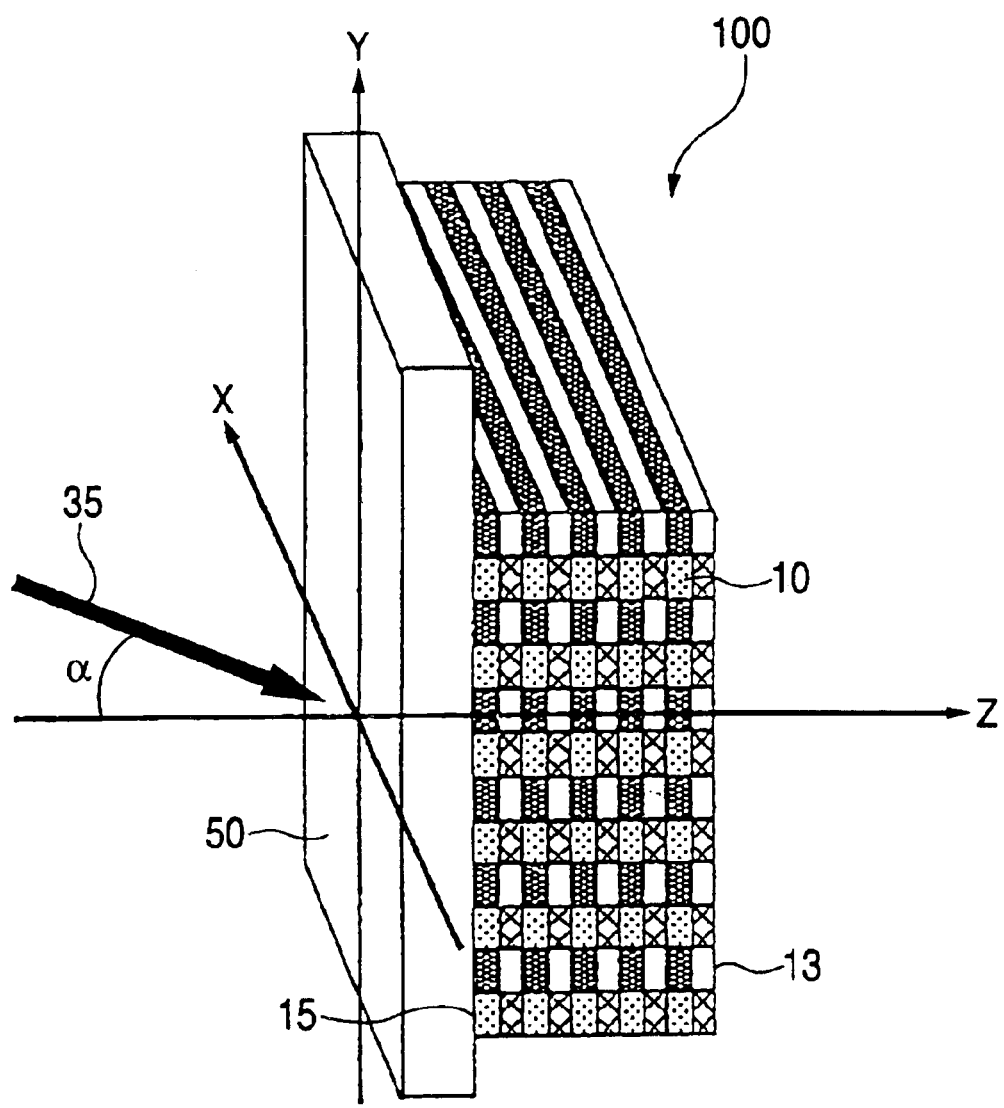
FIG. 1 is a typical view showing the structure of an optical element according to the invention.
Figure 2:
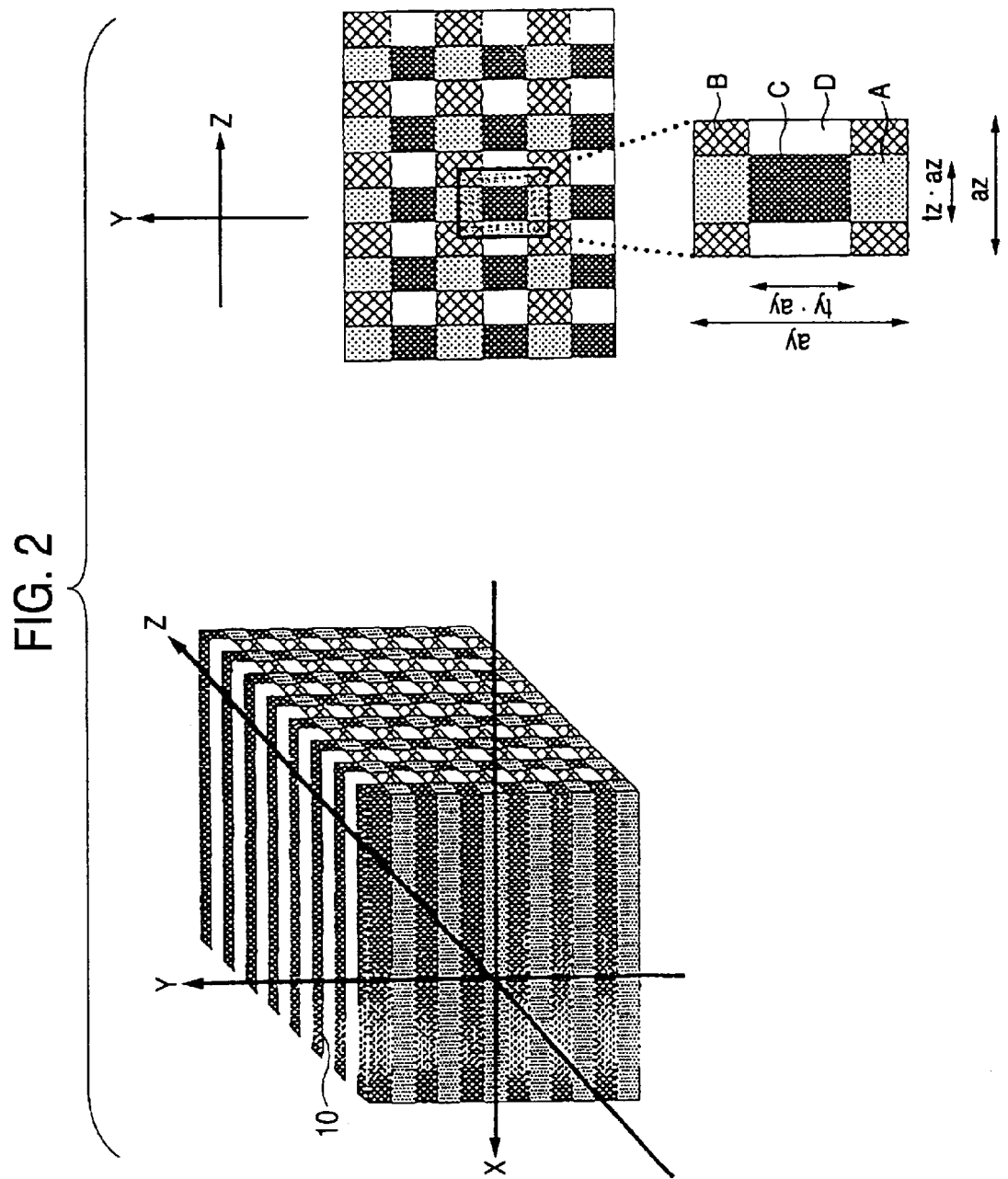
FIG. 2 is a typical view showing the two-dimensional photonic crystal structure according to the invention.

FIG. 1 schematically shows the structure of an optical element 100 according to the invention. The optical element 100 is constituted by a two-dimensional photonic crystal structure 10 formed on a transparent substrate 50. FIG. 2 shows a periodic structure of the two-dimensional photonic crystal portion. In an orthogonal coordinate system having X, Y and Z axes, the two-dimensional photonic crystal 10 has structurally periodic repetition in Y and Z directions but does not have structurally periodic repetition in an X direction. As shown in FIG. 2, a unit grating which is the smallest repetition unit of the periodic structure in the YZ plane is grouped into four regions A, B, C and D.

Refractive indices and periods of respective portions in the two-dimensional photonic crystal are defined as follows.

$n_1$: refractive index of the region A
$n_2$: refractive index of the region B
$n_3$: refractive index of the region C
$n_4$: refractive index of the region D
$a_y$: unit grating period in the Y-axis direction
$a_z$: unit grating period in the Z-axis direction
$t_y$: ratio between the regions C and A in the period $a_y$ ($0 < t_y < 1$)
$t_z$: ratio between the regions C and D in the period $a_z$ ($0 < t_z < 1$)

A photonic band chart for such a multilayer structure can be obtained by calculation based on the theory of photonic crystal. A method of calculation has been described in detail in "Photonic Crystals", Princeton University Press (1995) or Physical Review B, Vol.44, No.16, p.8565, 1991.

Figure 3:
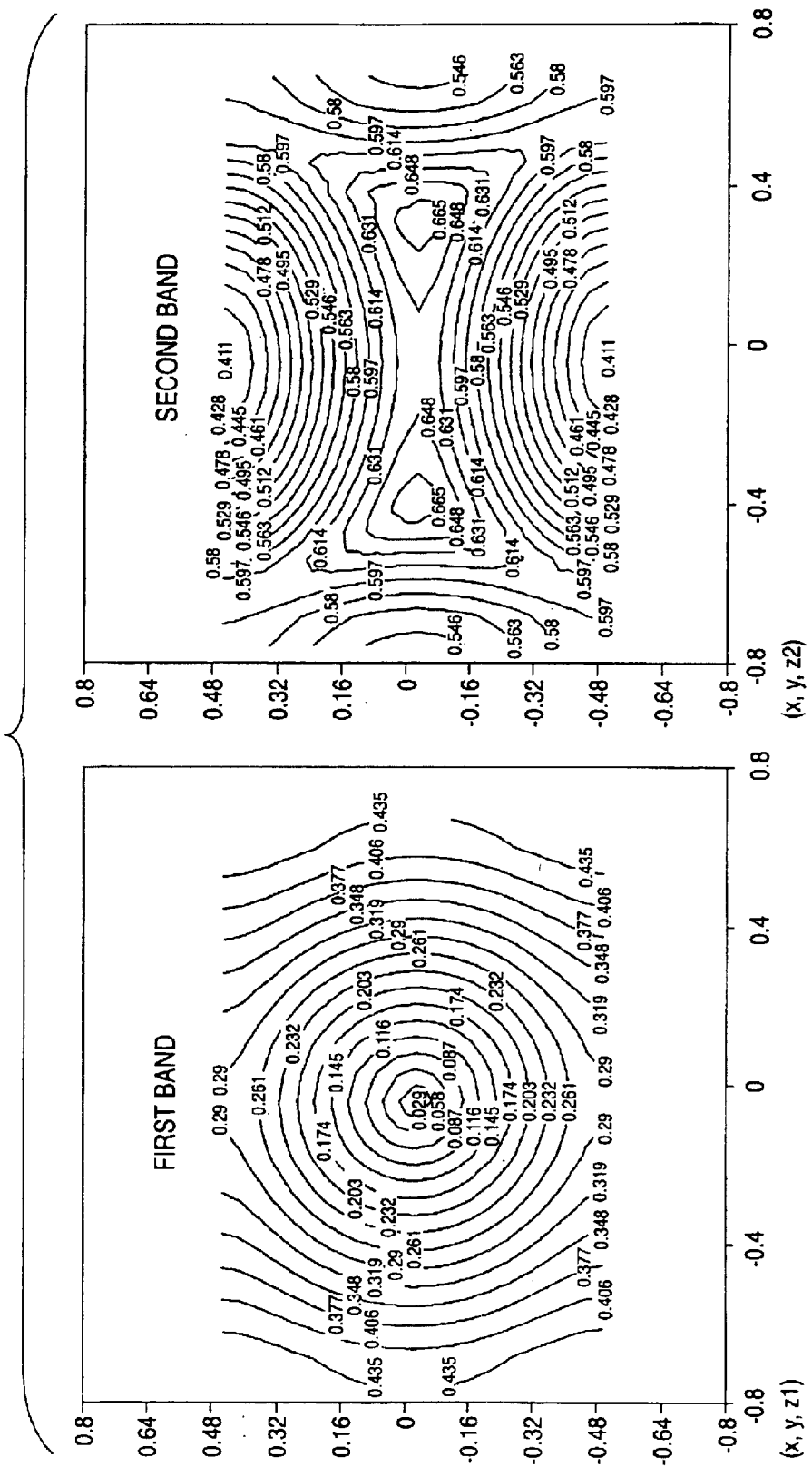
FIG. 3 is a graph showing an example of calculation results of photonic bands in the two-dimensional photonic crystal structure.

The Y-axis direction and Z-axis direction ranges of the band chart of the two-dimensional photonic crystal shown in FIG. 2 are limited by the periods respectively but the X-axis direction range (having no periodic structure) thereof is spread infinitely. FIG. 3 shows results of band calculation by a plane wave method. That is, in FIG. 3, results of band calculation of the first and second lowest bands in a plane wave method are expressed as contour diagrams each taken in a range of the first Brillouin zone in a YZ plane in the following condition.

$n_1 = 1.44$
$n_2 = 2.18$
$n_3 = 1.00$
$n_4 = 1.00$
$a_y = 1.00$
$a_z = 0.67$
$t_y = 0.5$
$t_z = 0.5$

Incidentally, the band calculation is performed in TE polarization (in which the direction of an electric field is equal to the X-axis direction). The band states are changed in TM polarization (in which the direction of a magnetic field is equal to the X-axis direction). Incidentally, a numeral given to each curve in FIG. 3 designates a normalized frequency given by the expression:

$$\omega a / 2\pi c$$

in which $\omega$ is the angular frequency of input light, a is a structural period in the Y direction, and c is the velocity of light in a vacuum. The normalized frequency can be also expressed as $a/\lambda_0$ in which $\lambda_0$ is the wavelength of input light in a vacuum. Accordingly, the normalized frequency will be referred to as $a/\lambda_0$ hereinafter. Each position in the Brillouin zone means a wave number vector, and each curve means a band according to the wavelength $\lambda_0$ (in a vacuum) of input light.

Figure 4:
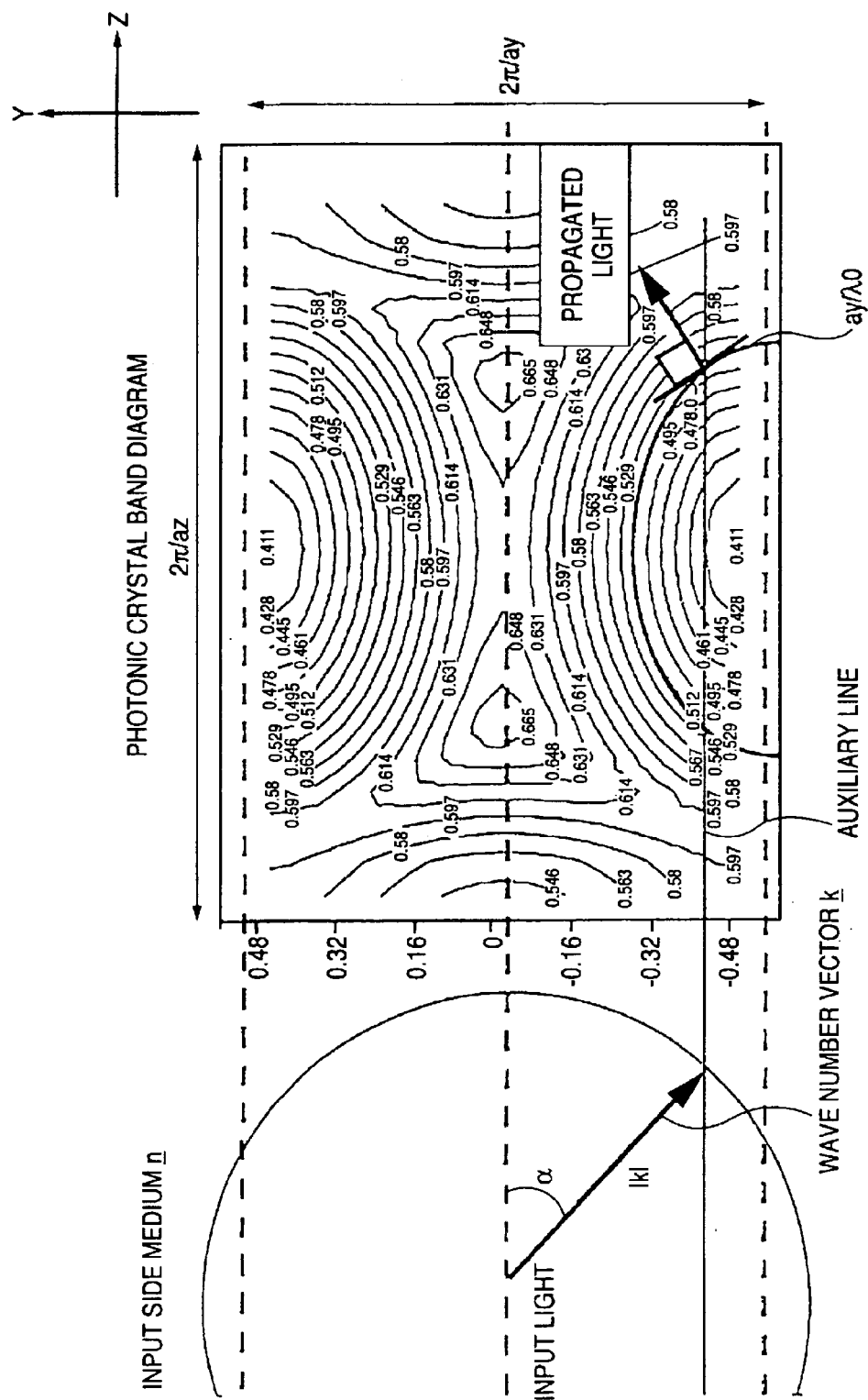
FIG. 4 is a graph showing propagation of light in the two-dimensional photonic crystal structure.

The direction in which light rays incident onto the photonic crystal will move in the photonic crystal can be judged from the band chart. When, for example, a band diagram is generated as shown in FIG. 4, propagation of light can be understood easily. FIG. 4 shows the state of propagation in the case where light is input from the air into the photonic crystal at a certain angle. The state of propagation will be described below in detail.

Assume now the case where light flux exhibiting a wavelength $\lambda_0$ in a vacuum is input into the photonic crystal. When n is the refractive index of an input side medium for the input light flux and $\alpha$ is the angle of incidence onto the photonic crystal, a wave number vector k of light flux in a reciprocal lattice space can be expressed on the basis of a circle with a radius R as shown in FIG. 4 and the magnitude of the wave number vector k is given by the following expression.

$$|k| = 2\Pi n / \lambda_0$$

On the other hand, when $a_y$ is the period of the photonic crystal in the Y direction (parallel to the substrate surface), a band curve of $a_y/\lambda_0$ corresponds to the light flux. This means that light (energy) is propagated in a direction of a line normal to the band curve at each intersection point between the band curve and an auxiliary line in FIG. 4.

It is obvious from this fact that the direction of propagation in the crystal changes according to the band structure when the wavelength of input light is changed. Because the band diagrams in the two-dimensional photonic crystal are shaped uniquely as shown in FIG. 3, the two-dimensional photonic crystal can be applied to a spectroscopic element having high dispersion characteristic if the inclination between the input surface and the output surface is selected suitably.

In the invention, the two-dimensional photonic crystal is however shaped like a parallel plane structure having both output end surface 13 and input end surface 15 perpendicular to the Z axis as shown in FIG. 1. Light is input into the two-dimensional photonic crystal in the condition that the direction of input light 35 is parallel to the YZ plane but inclined to a line normal to the input end surface 15.

Assume now the case where TE polarized light at α=52° and $a_y/\lambda_0$=0.6 is input. For the sake of simplification, assume the case where both input side and output side media abutting on the two-dimensional photonic crystal are homogeneous media having a refractive index of 1. In the band structure shown in FIG. 2, the vertical axis corresponds to the Y axis, and the horizontal axis corresponds to the Z axis. Because the two-dimensional photonic crystal has structurally periodic repetition in the two axes, the two axes are limited by boundary lines of $\pm \Pi/a_y$ and boundary lines of $\pm \Pi/a_z$ respectively.

Figure 5:
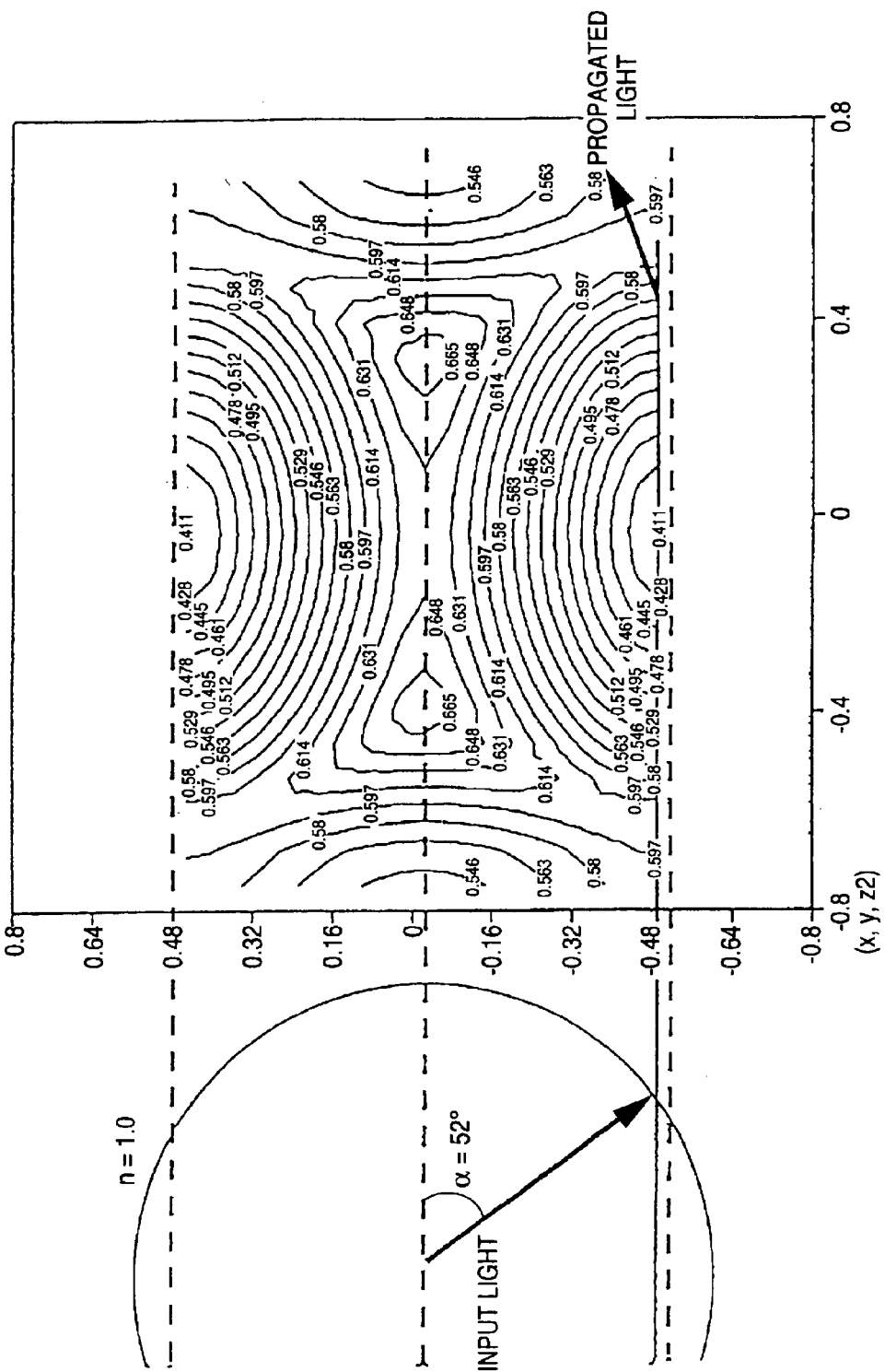
FIG. 5 is a graph showing propagation of light obliquely input into the two-dimensional photonic crystal structure.

When the same diagram as shown in FIG. 4 is applied to the band structure shown in FIG. 2, it is understood that only propagated light based on the second band is present in the photonic crystal as shown in FIG. 5 because the normalized frequency $a_y/\lambda_0$ is 0.6. FIG. 5 shows a wave number vector indicating the direction of propagation of energy. It is understood from the diagram that obliquely input light is propagated toward the upper right in the photonic crystal.

Figure 6:
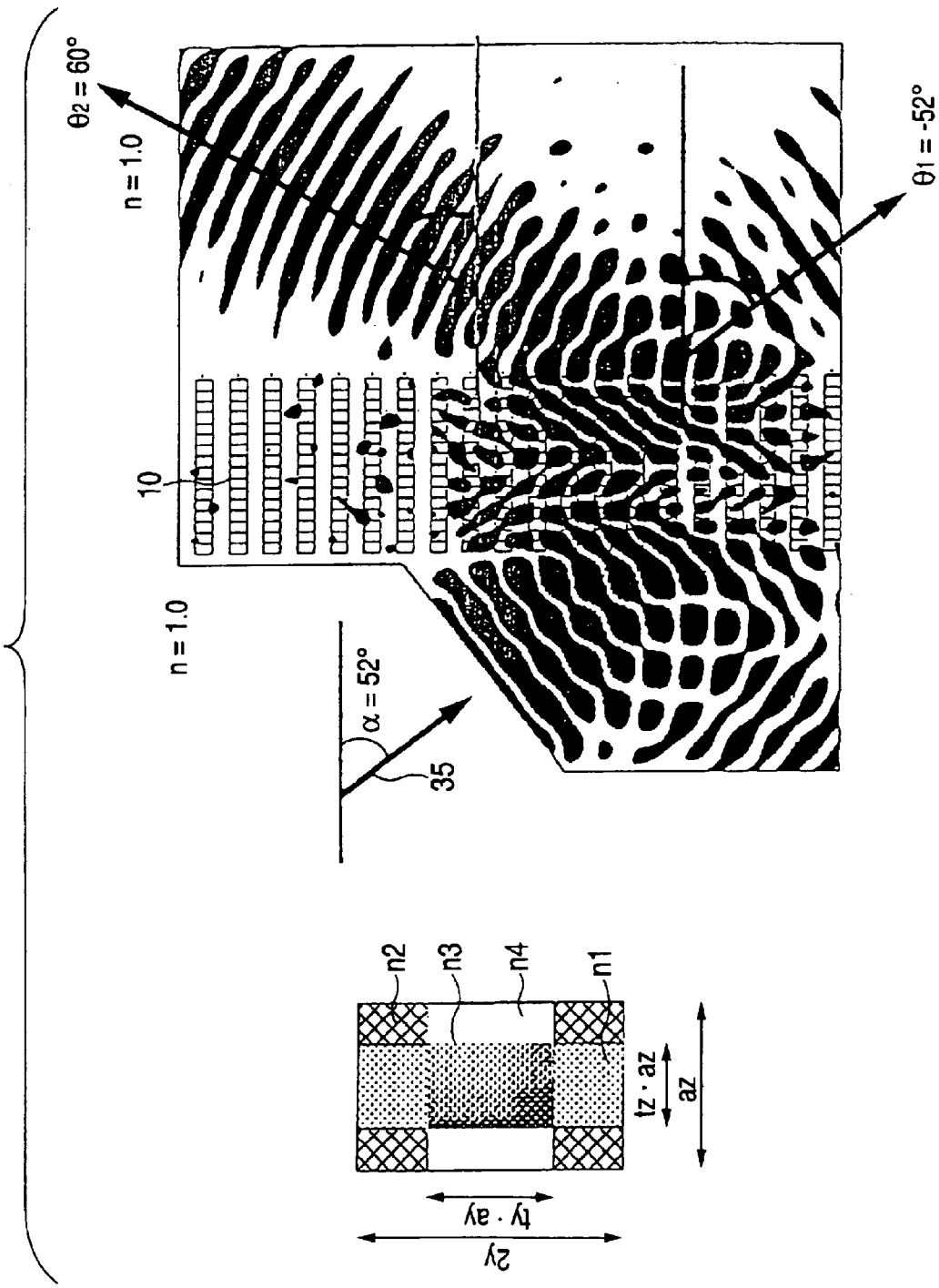
FIG. 6 is a view showing an example of a result of calculation concerning propagation of light in the two-dimensional photonic crystal structure according to the invention.

FIG. 6 shows a result of calculating the state of propagation of light by a finite-element method in the case where the configuration of the photonic crystal and input light is the same as in FIG. 5. It is obvious from FIG. 6 that light rays at an angle $\theta_1$ of −52° (hereinafter referred to as "first output light") and light rays at an angle $\theta_2$ of 60° (hereinafter referred to as "second output light") exit from the output surface. The direction of the first output light is equal to that of the input light. The result shown in FIG. 6 can be understood on the basis of the unique propagation in the photonic crystal and the diffraction phenomenon in the output surface.

Figure 7:
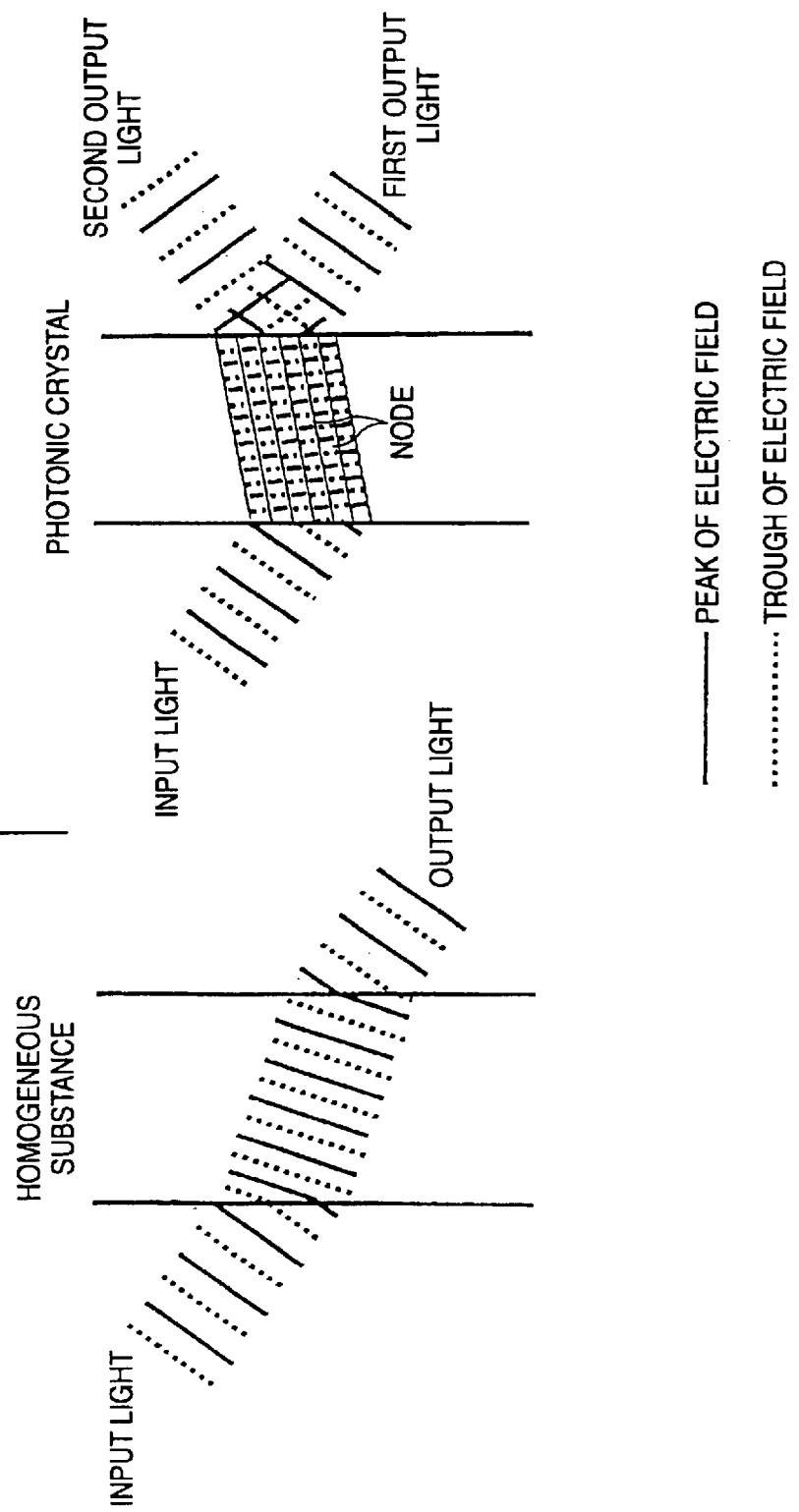
FIG. 7A is a typical view showing propagation of light in a homogeneous substance.
FIG. 7B is a typical view showing propagation of light in the two-dimensional photonic crystal structure according to the invention.

FIG. 7A typically expresses the wave front in terms of peaks and troughs of electric field in the case where a plane wave is input into a homogeneous substance. The wave is always a plane wave even in the case where the direction of light flux changes. In propagation in the photonic crystal, however, nodes of electric field appear periodically so that phases on both sides of each node shift by a half wavelength from each other (FIG. 7B). Although the interval between adjacent nodes in the Y-axis direction is often equal to $a_y$, the interval may take a value different from $a_y$. (Assume now that the interval is $a_y$.) Hereinafter, such propagated light is referred to as "diffractive propagated light".

The diffractive propagated light exits, as plane waves equivalent to light rays of the order of diffraction of ±1 by a diffraction grating of a period $2a_y$, from the output surface because of the periodic phase shift. The plane waves are equivalent to the "first output light" and the "second output light" respectively. The diffractive propagated light has such characteristic that output light equivalent to zero-order diffracted light is little generated because regions partitioned by nodes are equal in intensity and the phase shift is a half wavelength accurately.

When input light contains two kinds of wavelengths ($\lambda_1$ and $\lambda_2$), wavelength dispersion does not occur in the first output light because the direction of the first output light is equal to that of the input light whereas wavelength dispersion occurs in the second output light so that the wavelength dispersion can be used for separating light.

Figure 8:
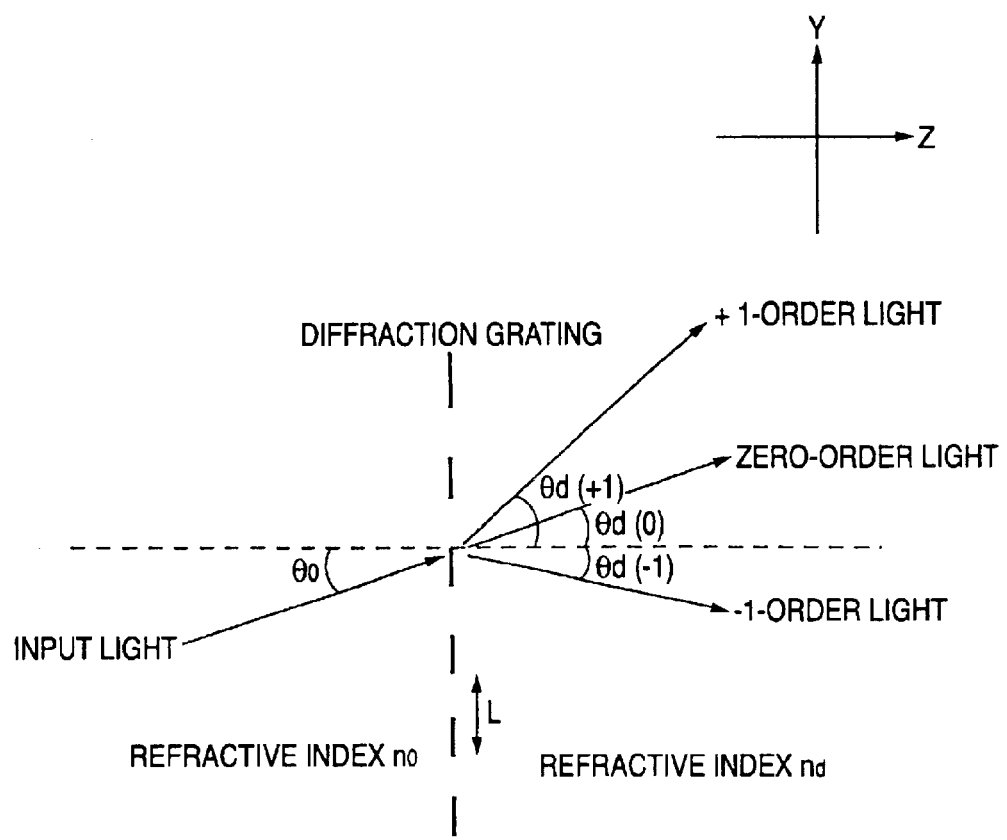
FIG. 8 is a view showing propagation of light in a diffraction grating.

FIG. 8 shows a diffraction grating of a period L having the same diffracting function as that of the photonic crystal for explaining the superiority of the photonic crystal over a so-called classical diffraction grating. Calculation for the diffraction grating is performed by the following expression (3) like the expression (1).

$$n_d \cdot \sin \theta_{d(m)} - n_0 \cdot \sin \theta_0 = m\lambda/L \tag{3}$$

in which
$n_0$: refractive index of the input side medium
$\theta_0$: input angle
$n_d$: refractive index of the output side medium
$\theta_{d(m)}$: output angle of the m-order light
m: order of diffraction (=0, ±1, ±2, ±3, . . . )
λ: wavelength
L: lattice period (=$2a_y$)

When the expression (3) is rewritten for the order of diffraction of ±1, the following expressions (4) and (5) are obtained.

$$n_d \cdot \sin \theta_{d(+1)} - n_0 \cdot \sin \theta_0 = \lambda/L \text{ (+1-order light)} \tag{4}$$

$$n_d \cdot \sin \theta_{d(-1)} - n_0 \cdot \sin \theta_0 = -\lambda/L \text{ (−1-order light)} \tag{5}$$

Assume now that $\lambda_A$ and $\lambda_B$ are the two different wavelengths and that $\theta_{dA(+1)}$ and $\theta_{dB(+1)}$ are output angles of +1-order light in the wavelengths $\lambda_A$ and $\lambda_B$ respectively.

From the expression (4), the following expressions (6) and (7) hold.

$$n_d \cdot \sin \theta_{dA(+1)} - n_0 \cdot \sin \theta_{dA(0)} = \lambda_A/L \tag{6}$$

$$n_d \cdot \sin \theta_{dB(+1)} - n_0 \cdot \sin \theta_{dB(0)} = \lambda_B/L \tag{7}$$

Because the output angles $\theta_{dA(0)}$ and $\theta_{dB(0)}$ of zero-order light are equal to each other, the angular difference of +1-order light is given by the following expression (8).

$$\sin \theta_{dA(+1)} - \sin \theta_{dB(+1)} = 1/n_d \{(\lambda_A - \lambda_n)/L\} \tag{8}$$

Figure 9:
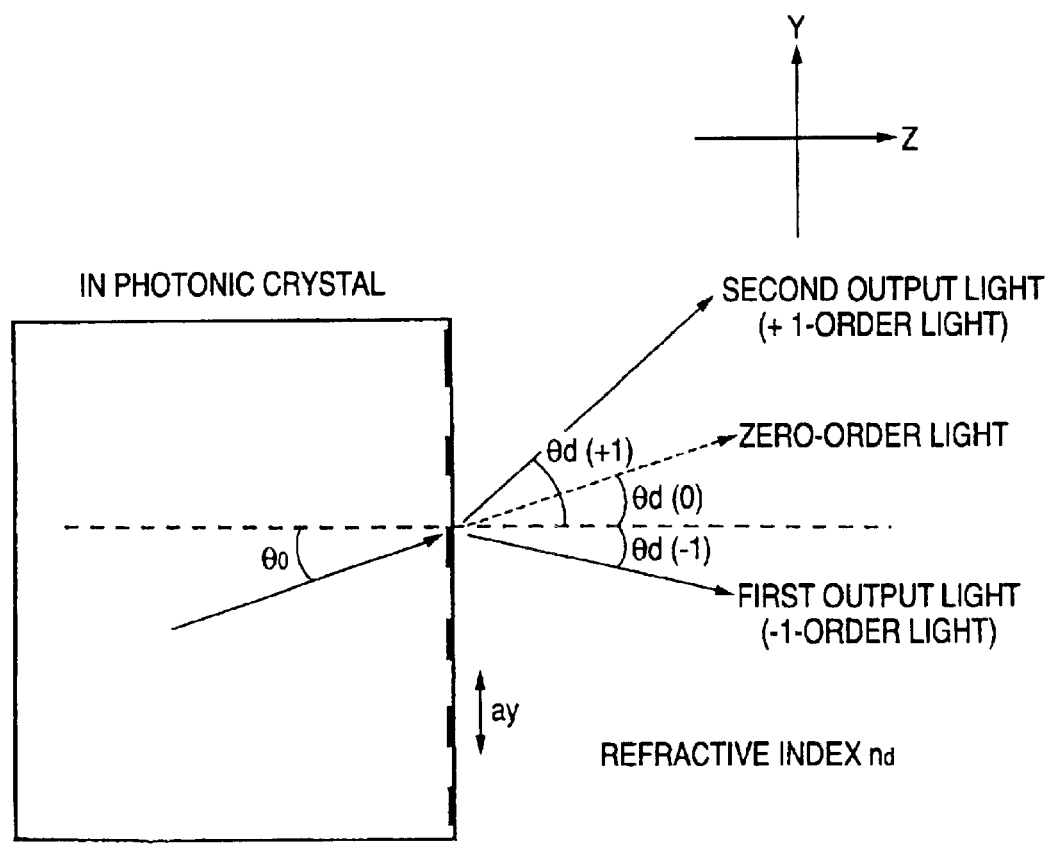
FIG. 9 is a view showing propagation of light in the two-dimensional photonic crystal structure according to the invention.

On the other hand, when λ in the two-dimensional photonic crystal changes, the following expressions (9) and (10) are derived by application of the expression (4) to $\lambda_A$ and $\lambda_B$. FIG. 9 shows an outline of this case.

$$n_d \cdot \sin \theta_{dA(+1)} - n_0 \cdot \sin \theta_{dA(-1)} = 2\lambda_A/L \tag{9}$$

$$n_d \cdot \sin \theta_{dB(+1)} - n_0 \cdot \sin \theta_{dB(-1)} = 2\lambda_B/L \tag{10}$$

Incidentally, in this case, −1-order light expresses the first output light and +1-order light expresses the second output light.

Because the output angle of the first output light is constant, the relation $\theta_{dA(-1)} = \theta_{dB(-1)}$ holds. Accordingly, the angular difference of the second output light is given by the following expression (11).

$$\sin \theta_{dA(+1)} - \sin \theta_{dB(+1)} = 2/n_d \{(\lambda_A - \lambda_B)/L\} \tag{11}$$

It is obvious from the expressions (8) and (11) that the two-dimensional photonic crystal exhibits wavelength dispersion about twice as much as that obtained by the diffraction grating.

As described above, in the invention, highly wavelength-dispersed light caused by the photonic crystal can be taken out even in the case where the photonic crystal is simply shaped like a thin film. Accordingly, the process of cutting the output surface obliquely can be omitted, so that large wavelength dispersion can be achieved by a simple method of inputting light merely obliquely.

The large difference of the invention from the related-art diffraction grating is that the diffracting phenomenon depends on the band structure of the photonic crystal. According to the inventors' simulation, it is preferable that the structure of the photonic crystal and the wavelength and angle of input light satisfy the following conditions in order to obtain good characteristic of a spectroscopic element.

(1) A photonic band corresponding to input light is present in the first Brillouin zone.

$$R \cdot \sin \alpha = (2\pi/\lambda_0) \cdot n_A \cdot \sin \alpha < \Pi/a_y$$

Figure 10:
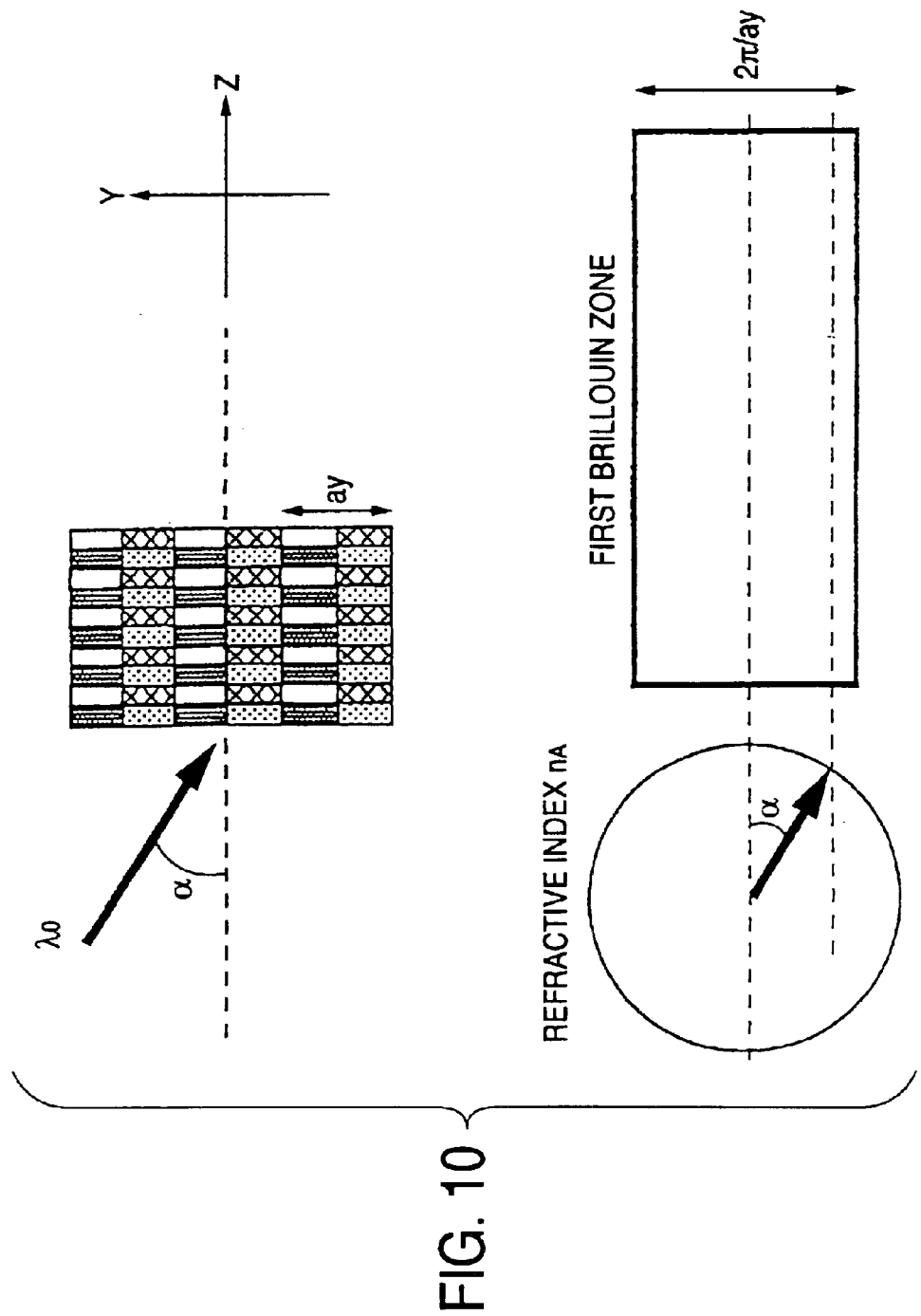
FIG. 10 is a view showing conditions of input light.

This can be given by the following expression (12) (see FIG. 10):

$$\{(n_A \cdot \sin \alpha)/2\} \cdot (a_y/\lambda_0) < 1 \quad (12)$$

in which $n_A$ is the refractive index of the input side medium.

When the photonic band corresponding to the input light goes out of the first Brillouin zone, surface reflection becomes so large that the efficiency of utilizing the input light is reduced greatly.

(2) The input angle $\alpha$ is selected to be in a range of from 40° to 70°, both inclusively.

If $\alpha$ is smaller than 40°, the intensity of the first output light exhibiting no wavelength dispersion increases undesirably. If $\alpha$ is larger than 70°, reflection from the input surface becomes so large that the amount of light input into the photonic crystal decreases undesirably.

(3) The photonic band corresponding to the input light is not the lowest.

This is because propagation due to the lowest photonic band resembles propagation in a homogeneous substance. "Nodular propagation" in which diffracted light is generated easily does not occur in the lowest photonic band.

(4) The angle $|\beta|$ between the Z axis and a line normal to the photonic band corresponding to the input light is not larger than 30°.

Figure 11:
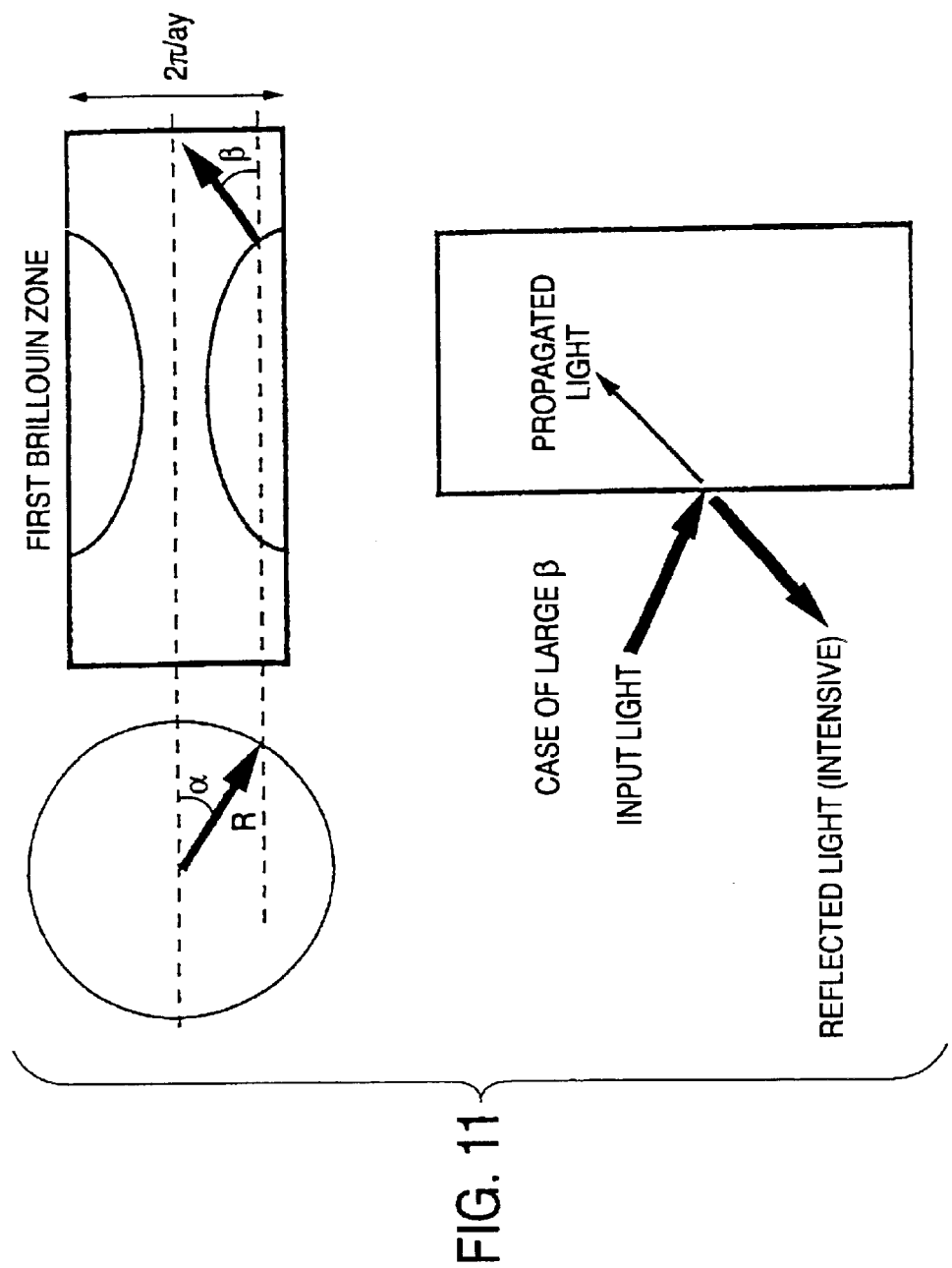
FIG. 11 is a view showing conditions of input light.

The line normal to the photonic band indicates the direction of movement of energy of propagated light. If this angle becomes large, propagated light has a tendency to decrease and reflected light has a tendency to increase (see FIG. 11). When a plurality of photonic bands correspond to the input light, at least one of the photonic bands except the lowest band must satisfy the aforementioned condition.

Figure 12:
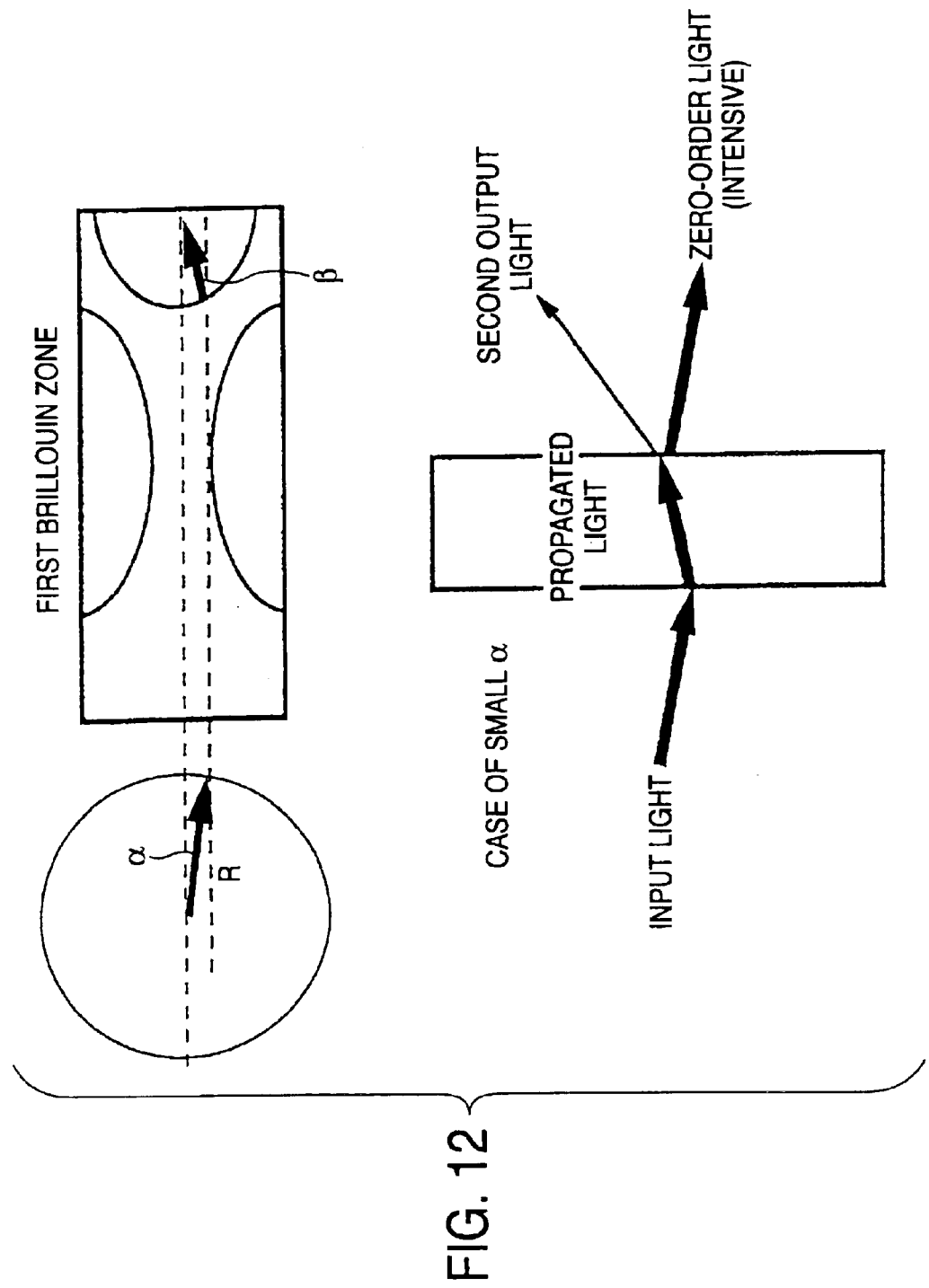
FIG. 12 is a view showing conditions of input light.

(5) The photonic band corresponding to the input light is far by a certain distance from the Z axis of the first Brillouin zone (see FIG. 12).

If the input light is incident perpendicularly ($\alpha=0°$), zero-order diffracted light in FIG. 12 is apt to be generated because two nodes of propagated light are generated in one period ($a_y$) in the Y-axis direction. If the photonic band corresponding to the input light is near the Z axis, the same propagation occurs.

Incidentally, it is obvious from FIGS. 3 and 4 that only the first band is present when the average refractive index $n_M$ of the periodic structural portion satisfies the following relation.

$$a/\lambda_0 < 0.5/n_M$$

Therefore, in order to use the second or higher bands, the period a of the multilayer structure needs to satisfy the following relation for the used wavelength $\lambda_0$.

$$\lambda_0/2n_M < a$$

If the period a is smaller than $\lambda_0/2n_M$, the characteristic of the multilayer structure comes near to that of a homogeneous substance having the average refractive index because only the first band light is propagated. If $a/\lambda_0$ is too large, the high-order band light rays participate complexly, undesirably. Specifically, $a/\lambda_0$ is preferably selected to be in the following range.

$$0.3 < a/\lambda_0 < 1.5$$

A result of evaluation of spectroscopic characteristic of the two-dimensional photonic crystal structure produced in the condition that the aforementioned preferable conditions are satisfied will be described below. In addition, the result will be compared with a result of simulation.

EXAMPLE

Figure 13:
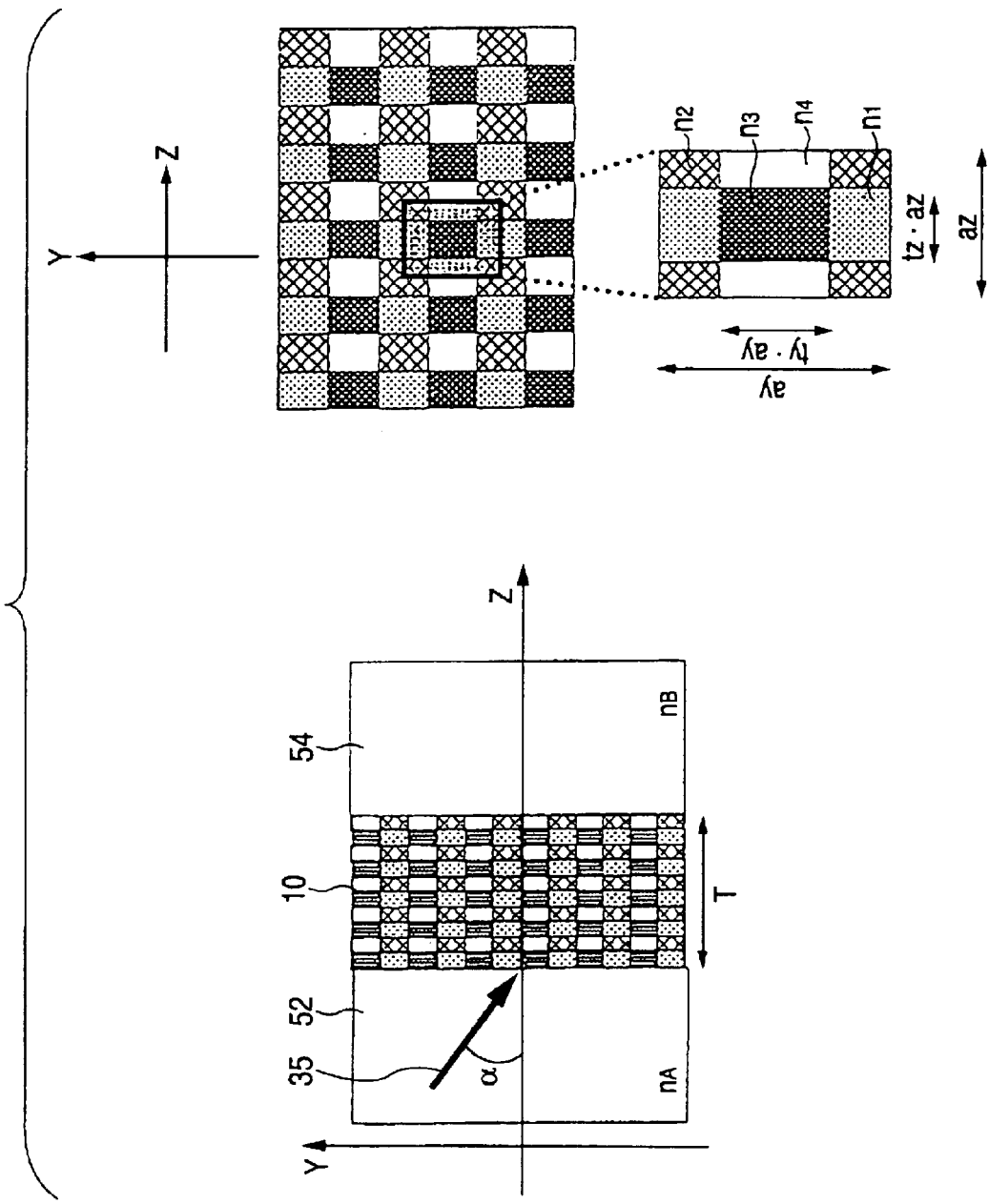
FIG. 13 is a view showing respective constants in the optical element.

FIG. 13 shows respective constants in the optical element according to the invention. Besides $n_1$, $n_2$, $n_3$, $n_4$, $a_y$, $a_z$, $t_y$, $t_z$ (each length decided on the basis of $a_y$) and thickness T concerning the two-dimensional photonic crystal, the refractive index $n_A$ of an input side medium 52 and the refractive index $n_B$ of an output side medium 54 are used as ambient conditions and the wavelength $\lambda_0$ of input light, the state of polarization and the input angle $\alpha$ are used as input light conditions. A sample was produced in the condition that the constants concerning the two-dimensional photonic crystal were set to have values shown in Table 1.

Figure 14:
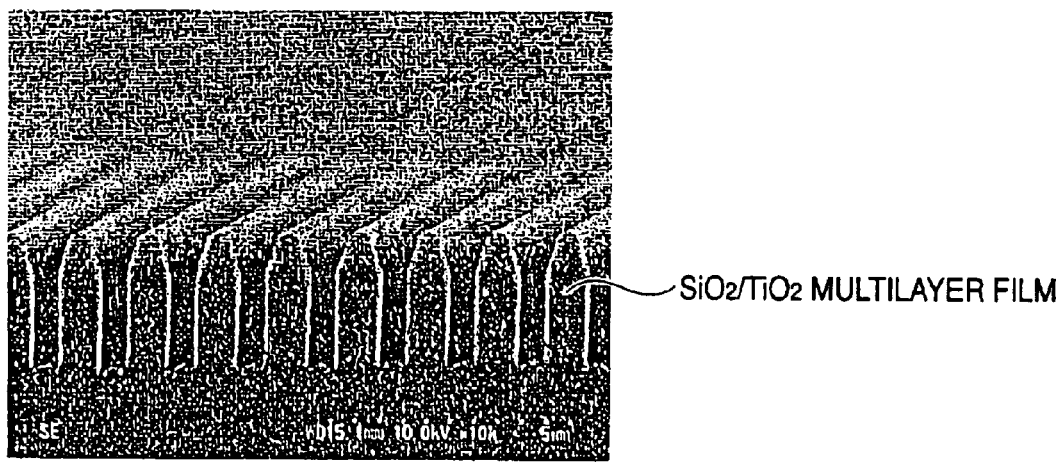
FIG. 14 is a view showing the sectional shape of a sample used in an experimental example.

Specifically, a multilayer film which was a five periods' laminate of layers of alternate silicon dioxide (refractive index $n_1=1.46$) and titanium oxide (refractive index $n_2=2.18$) each having a layer thickness of 310 nm was formed on a quartz glass substrate by a sputtering method. Grooves each having a predetermined width were formed at intervals of a predetermined period of 1300 nm perpendicularly in a film surface of the multilayer film by reactive ion etching so that the multilayer film structure was formed as a two-dimensional photonic crystal. FIG. 14 shows a photograph of a section of the produced two-dimensional photonic crystal.

TABLE 1

| Constant | $n_1$ | $n_2$ | $n_3$ | $n_4$ | $a_y$ | $a_z$ | $t_y$ | $t_z$ |
|---|---|---|---|---|---|---|---|---|
| Example | 1.46 | 2.18 | 1.00 | 1.00 | 1.00 | 0.67 | 0.5 | 0.5 |

$T=15 \, a_z$ $\alpha=7.0°$ $n_A=1.0$ $n_B=2.0$

Input light: $\lambda_0=1.366 a_y$

TE polarization (the direction of electric field is equal to the X-axis direction)

Figure 15:
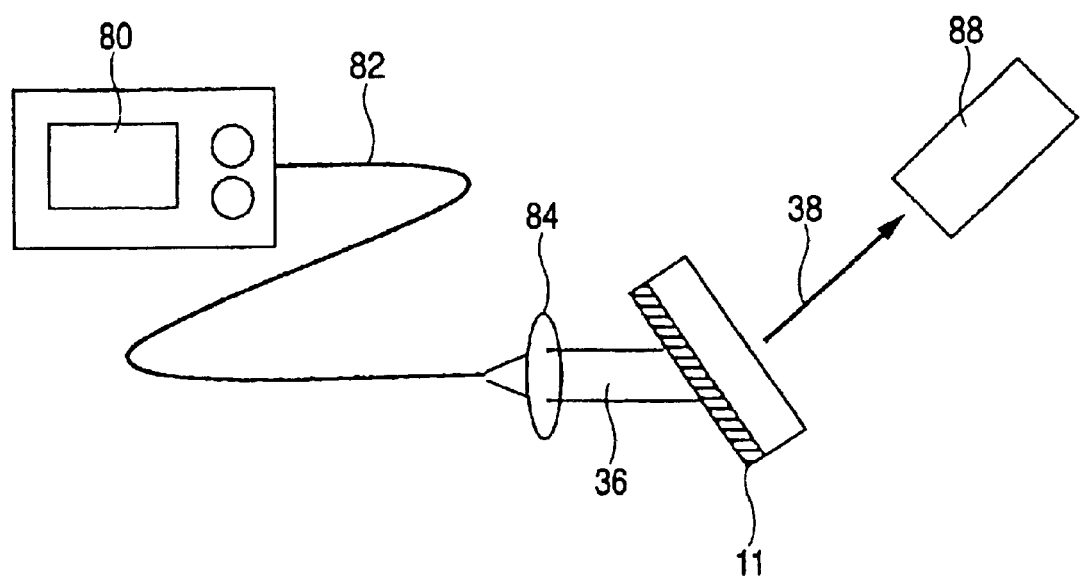
FIG. 15 is a view showing a spectroscopic characteristic evaluation system used in the experimental example.

Plane wave having no intensity distribution in the width of the periodic structural portion FIG. 15 schematically shows a measuring system. As input light, TE polarized light (in which the direction of electric field was equal to the X-axis direction) emitted in a wavelength $\lambda_0$ range of from 1510 nm to 1590 nm (equivalent to a wavelength $\lambda_0$ range of from $1.161 a_y$ to $1.223 a_y$) from a semiconductor laser light source 80 capable of changing the wavelength of the light was supplied to an optical system 84 through an optical fiber 82. The light was collimated to a parallel light beam 36 having a beam diameter of about 1 mm, by the optical system 84. The parallel light beam 36 was input at an angle α45° into the multilayer film 11 from the surface side ($n_A$=1.0). Output light 38 was taken out from the quartz glass substrate side ($n_B$=1.46), so that the output angle $\theta_d$ was observed and measured by a CCD infrared camera 88.

Figure 16:
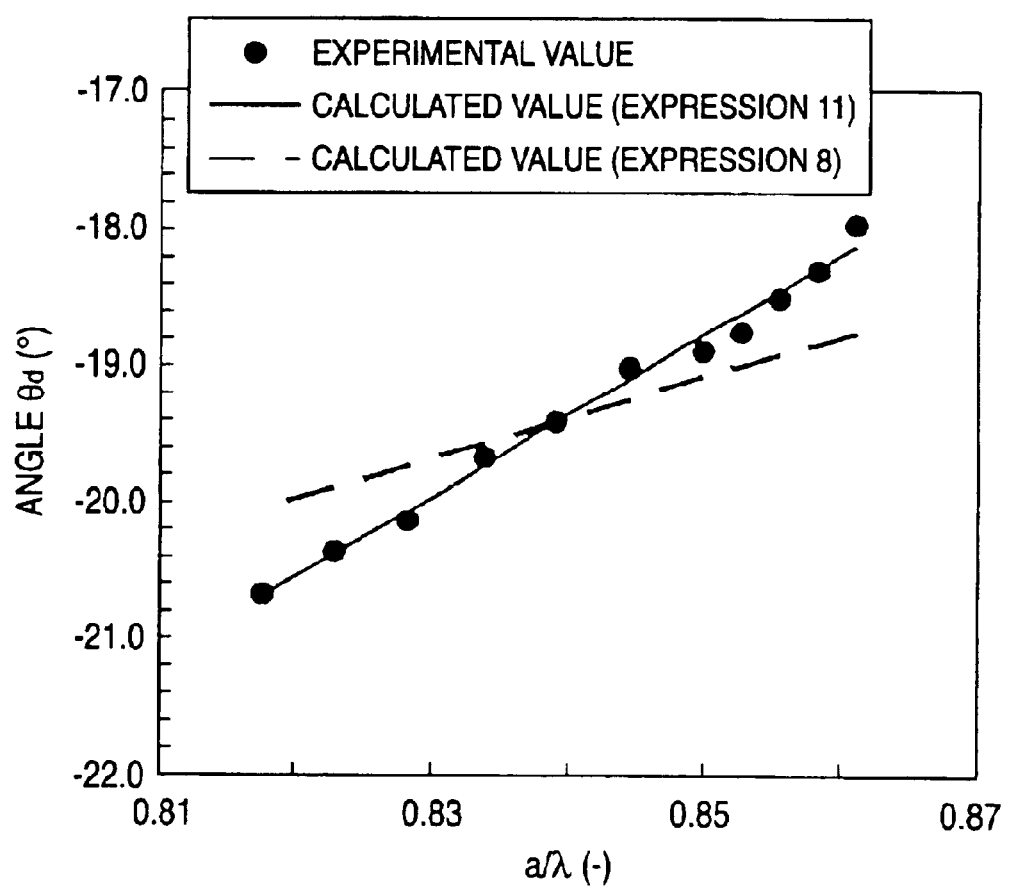
FIG. 16 is a graph showing wavelength dispersion in the experimental example.

As a result, the first and second output light rays could be confirmed. In addition, wavelength dispersion of only the latter was measured. FIG. 16 shows a result of wavelength dispersion in the substrate. In FIG. 16, the vertical axis shows a dispersion angle in the substrate and the horizontal axis shows a normalized frequency. It is obvious from FIG. 16 that the dispersion angle increases as the normalized frequency decreases (or as the wavelength increases). The dispersion angle varies by about 0.5° according to a wavelength change of 1%. Values calculated by the expressions (8) and (11) respectively are also shown in FIG. 16. The experimentally measured value of wavelength dispersion well agrees with the value calculated by the expression (11) and is twice as large as the value calculated by the expression (8) for the related-art diffraction grating.

Next, the structure shown in Example was examined in comparison with simulation. The simulation was performed by a finite-element method. A software program used was JMAG made by The Japan Research Institute, Limited.

Figure 17:
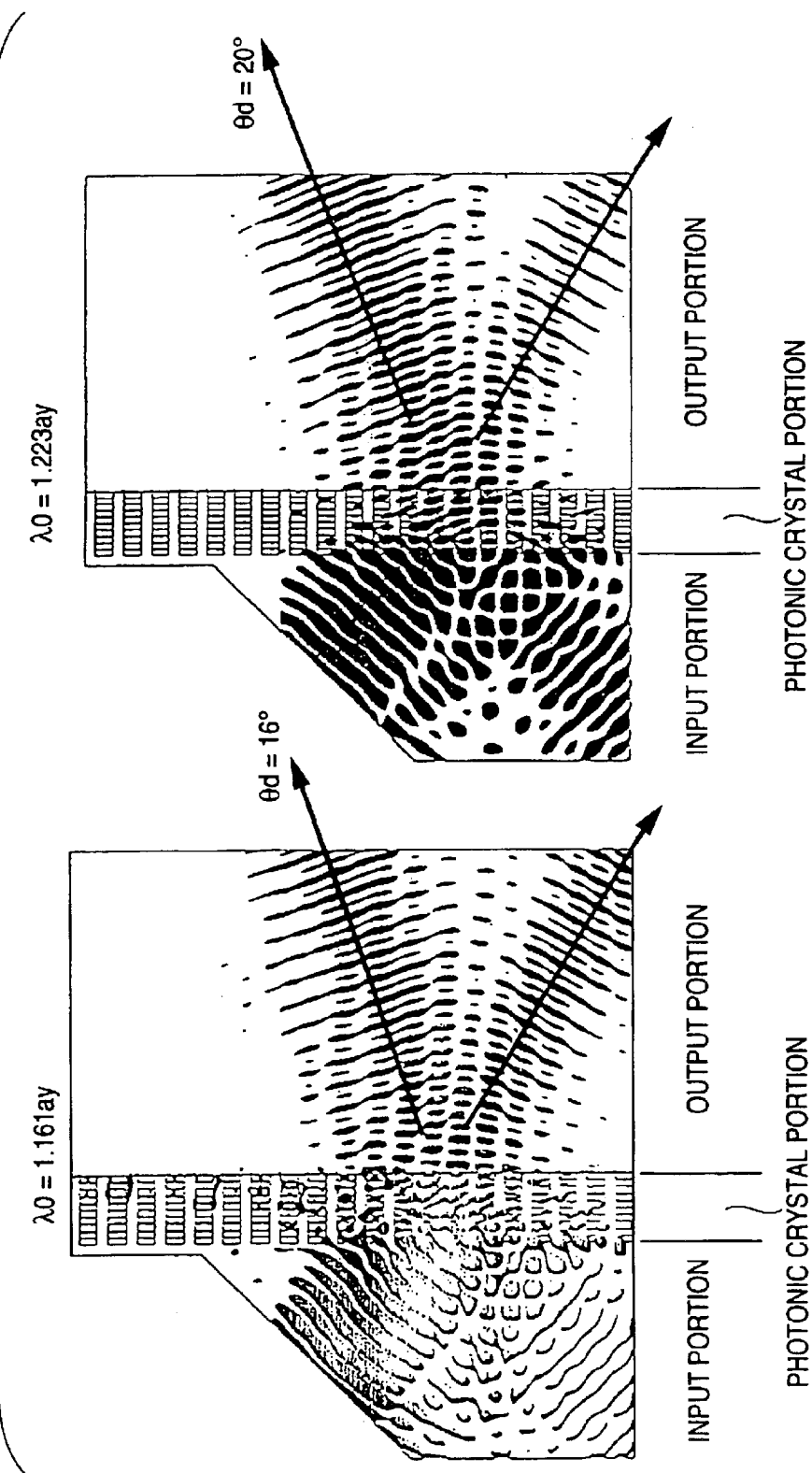
FIG. 17 is a view showing calculation results of propagation of light in a structure according to an embodiment of the invention.

Respective constants were set to be equal to those in Example. Calculation was performed at two input wavelengths $\lambda_0$=1.161$a_y$ and $\lambda_0$=1.223$a_y$. FIG. 17 shows a state of propagation of light by a finite-element method. It can be confirmed from FIG. 17 that the first and second output light rays are propagated. The first output light exhibits no wavelength dispersion because the angle of propagation of the first output light is constant. On the other hand, the angle $\theta_d$ of propagation of the second output light exhibits dispersion.

TABLE 2

| $\lambda_o$ | 1.161$a_y$ | 1.223$a_y$ |
|---|---|---|
| $\theta_d$ | 16° | 20° |

This is a result which approximately agrees with the experimental value. On the other hand, zero-order light is very weak. This corresponds to the fact that zero-order light cannot be confirmed experimentally.

Next, propagation of light flux obliquely input into the two-dimensional photonic crystal was simulated by a finite-element method in conditions different from the conditions used in Example.
A result of the simulation will be described.

Calculation Example 1

The structure of the two-dimensional photonic crystal and the condition of input light are shown in Table 3.

TABLE 3

| Constant | $n_1$ | $n_2$ | $n_3$ | $n_4$ | $a_y$ | $a_z$ | $t_y$ | $t_z$ |
|---|---|---|---|---|---|---|---|---|
| Calculation Example 1 | 1.46 | 2.18 | 1.00 | 1.00 | 1.00 | 0.67 | 0.5 | 0.5 |

Figure 18:
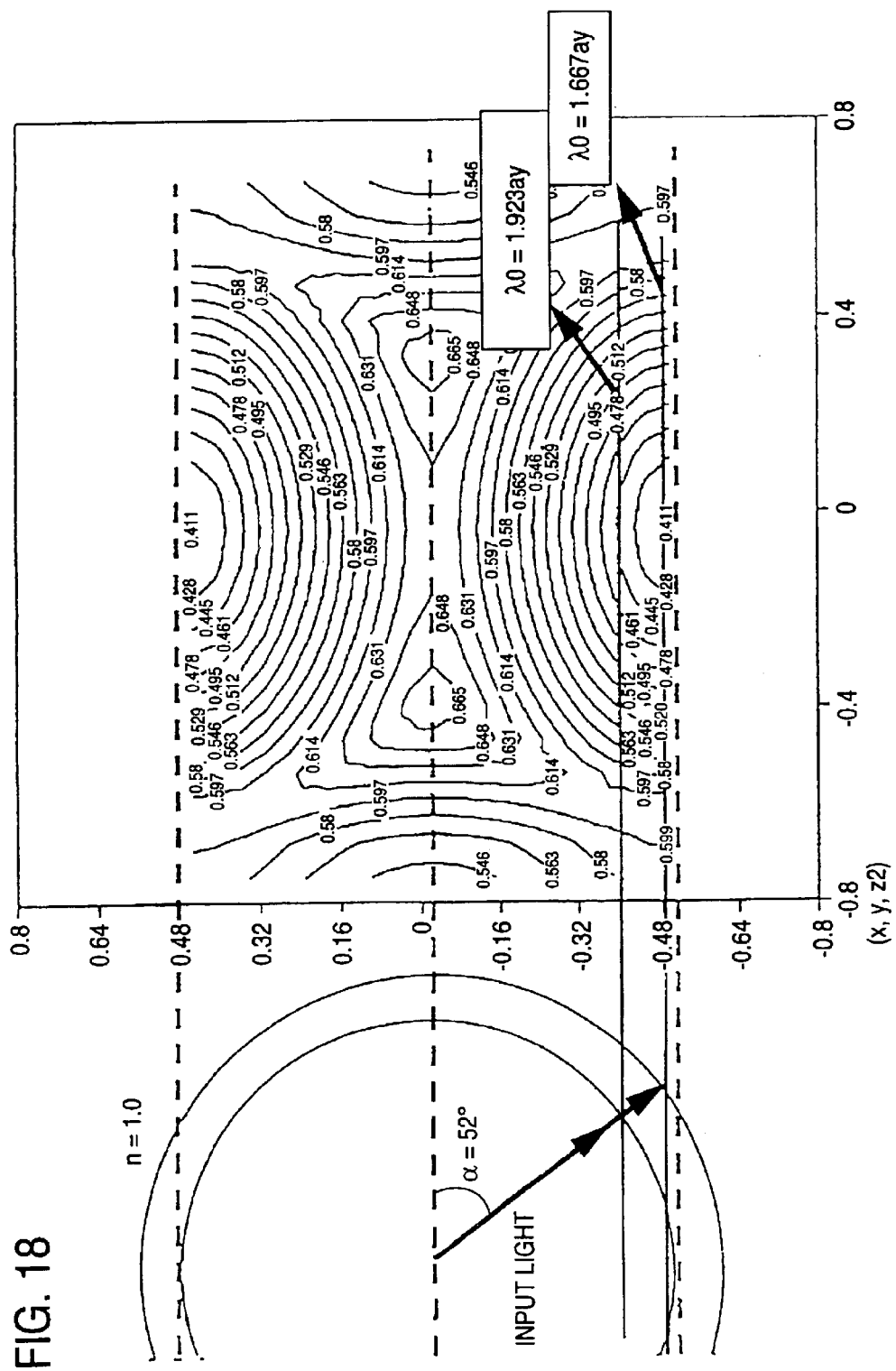
FIG. 18 is a band graph in Calculation Example 1.
Figure 19:
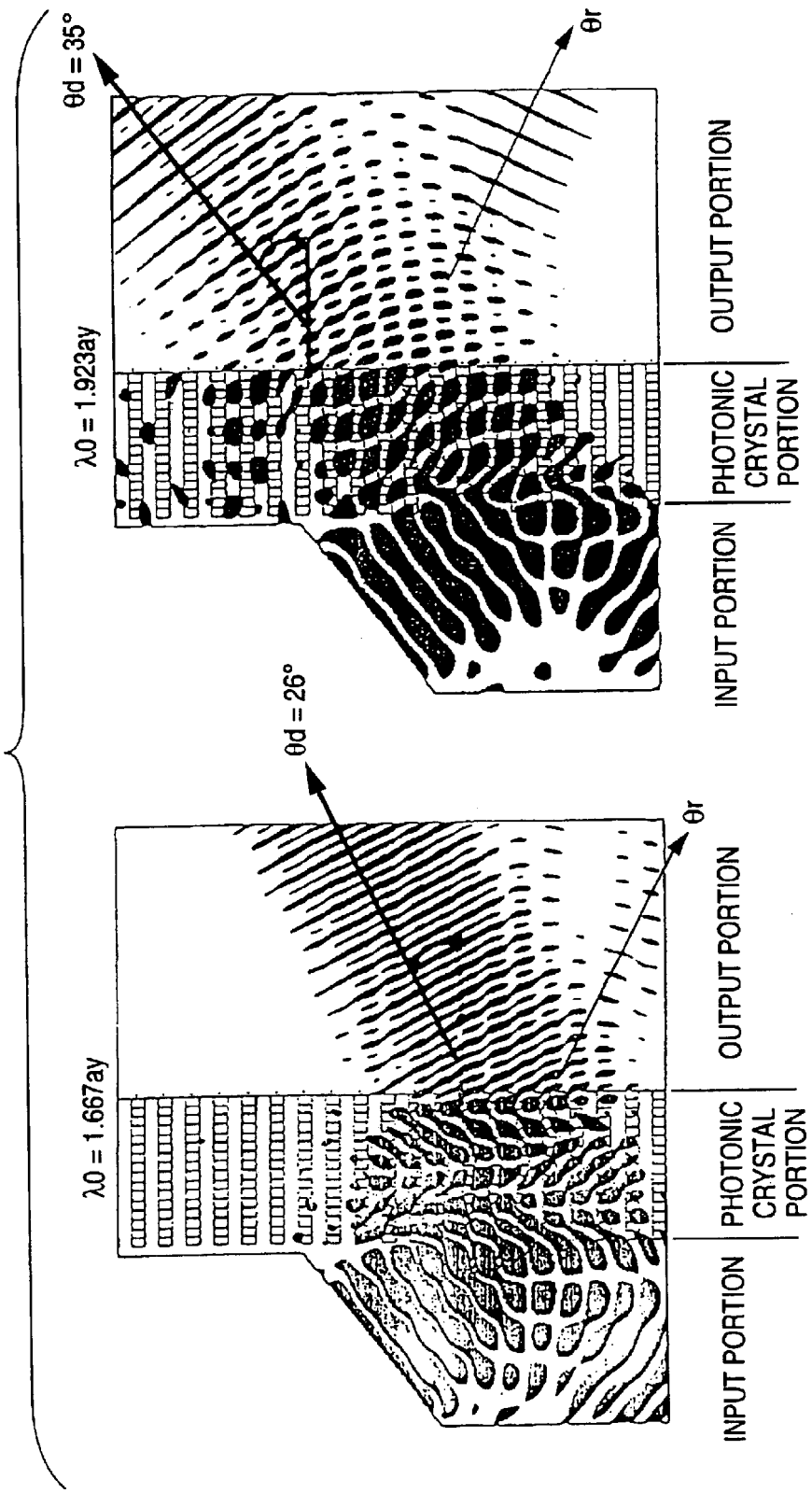
FIG. 19 is a view showing propagation of light in Calculation Example 1.

T=8 $a_z$
α=52.0°
$n_A$=1.0
$n_B$=2.0
Input light: $\lambda_0$=1.667$a_y$, 1.923$a_y$ FIG. 18 shows a band diagram (second band) according to a plane wave expansion method. In addition, the direction of propagation is also shown in FIG. 18. The region of propagation in this condition can be applied to the aforementioned conditions for obtaining diffracted light. FIG. 19 shows an electric field intensity distribution as a result of the finite-element method.

In the two-dimensional photonic crystal, the electric field intensity was formed as a nodular "checkered" pattern. It was found that propagated light corresponding to a high-order photonic band was obtained in the two-dimensional photonic crystal.

The angle of the first output light and the angle of the second output light in FIG. 19 are examined. The angle (expressed as $\theta_r$) of the first output light is fixed at α value corresponding to a regardless of the wavelength. On the other hand, the angle (expressed as $\theta_d$) of the second output light with respect to the Z axis varies according to the wavelength.

Figure 20:
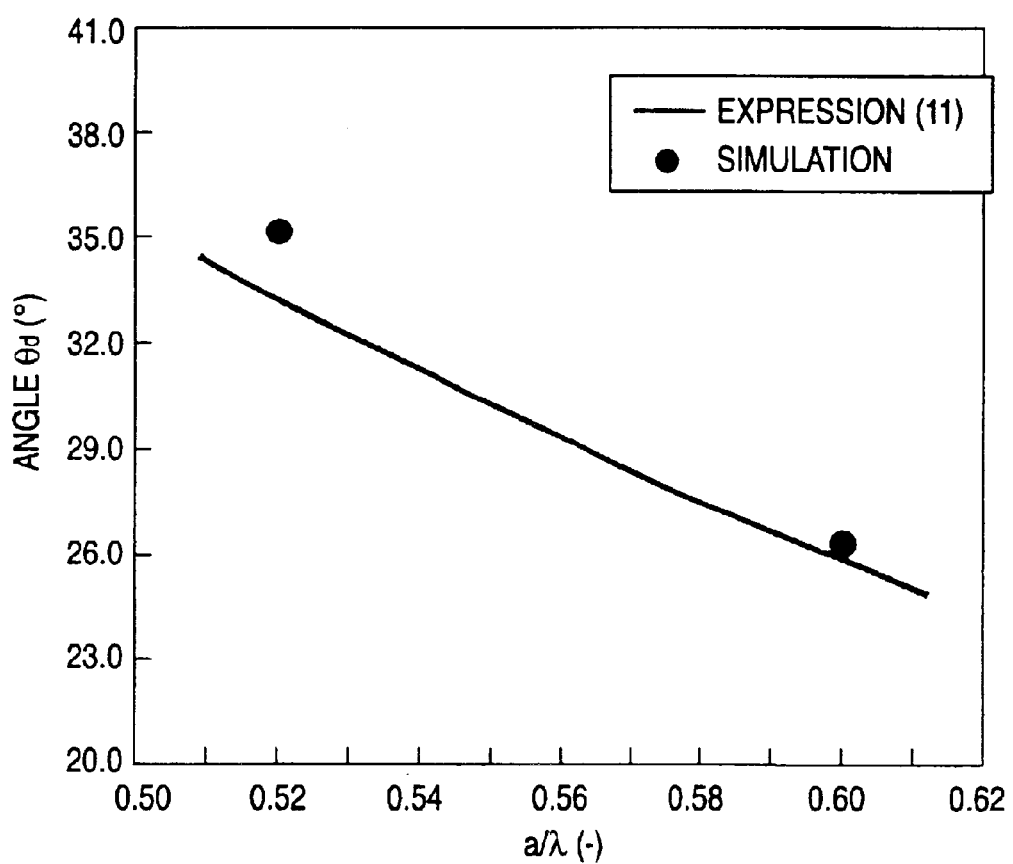
FIG. 20 is a graph showing comparison between a result of simulation in Calculation Example 1 and a diffraction equation.

FIG. 20 shows comparison between the angle $\theta_d$ obtained by simulation and the expression (11). The two correlate closely with each other. Accordingly, wavelength dispersion of the second output light is about twice as much as that obtained by the diffraction grating. In addition, light equivalent to the zero-order light is very weak, so that a judgment can be made from FIG. 19 that the efficiency of the diffraction grating (relative to the intensity of input light) is about 50%.

Calculation Example 2

Calculation was performed in the same manner as described above except that constants shown in Table 4 were used.

TABLE 4

| Constant | $n_1$ | $n_2$ | $n_3$ | $n_4$ | $a_y$ | $a_z$ | $t_y$ | $t_z$ |
|---|---|---|---|---|---|---|---|---|
| Calculation Example 2 | 1.46 | 2.18 | 1.00 | 1.00 | 1.00 | 0.48 | 0.5 | 0.5 |

Figure 21:
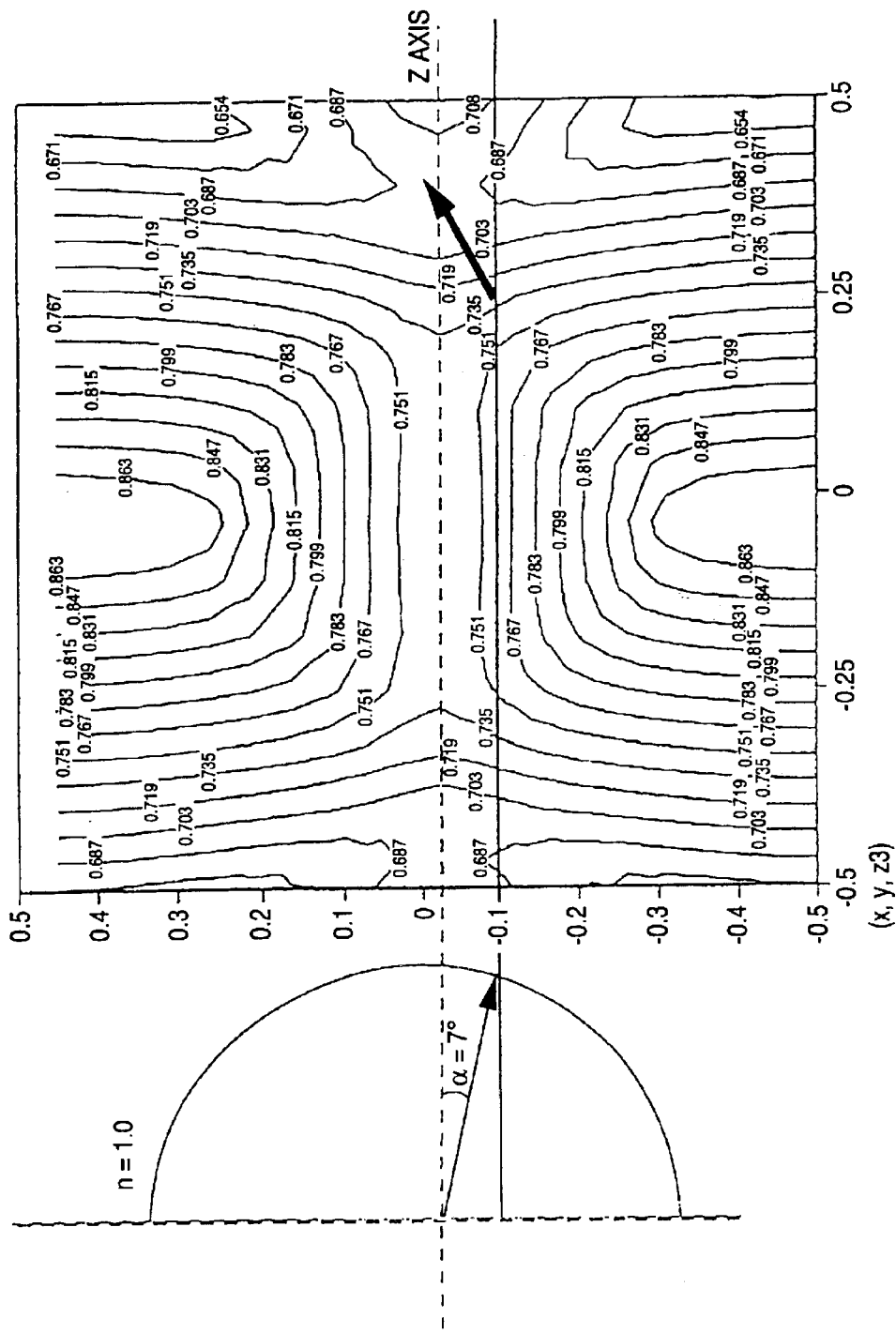
FIG. 21 is a band graph in Calculation Example 2.
Figure 22:
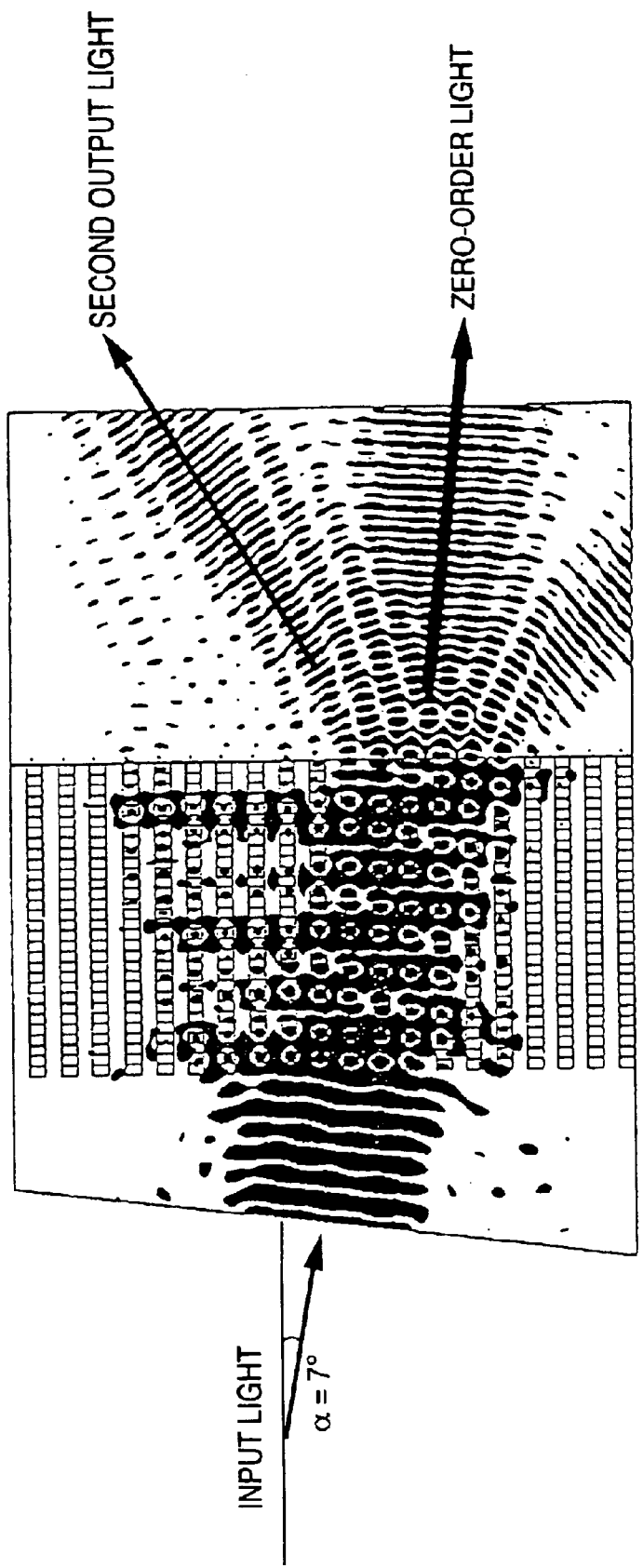
FIG. 22 is a view showing propagation of light in Calculation Example 2.
Figure 23:
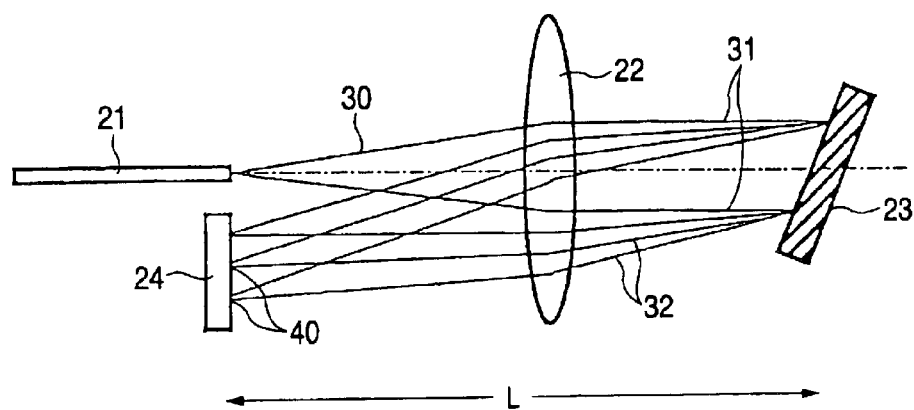
FIG. 23 is a conceptual view of a related-art spectroscopic element.

FIG. 21 shows a band diagram expressing a state of propagation. In this condition, it is obvious that a band corresponding to input light is present in a neighbor of the Z axis of the Brillouin zone. That is, the aforementioned preferable conditions cannot be satisfied. FIG. 22 shows a state of simulated propagation. It is obvious from FIG. 22 that zero-order light very strong in intensity is output.

The material of the two-dimensional photonic crystal according to the invention is not limited to the configuration constituted by four (or less) kinds of substances as shown in FIG. 2. For example, five or more kinds of substances may be used if periodicity can be provided surely.

The material substances of the photonic crystal used in the invention are not particularly limited if transparency can be provided surely in a used wavelength range. Besides silicon dioxide and titanium oxide used in the embodiment, preferred materials are silicon, tantalum oxide, niobium oxide, magnesium fluoride, etc. which are generally used as materials of a multilayer film and excellent in durability and film-forming cost.

It is however preferable that a refractive index ratio of not lower than 1.2 is selected surely because there is fear that the modulating function may be weakened to spoil the expected function if the refractive index difference between materials is too small. Although the refractive index ratio is preferably selected to be as high as possible, it is difficult to obtain materials allowed to be used in practice to have a refractive index ratio higher than 5. If materials are selected suitably, the function of the invention can be fulfilled in a generally used wavelength range of from 200 nm to 20 µm.

The material of the substrate is not particularly limited if it is transparent in a used wavelength range. Besides quartz glass, examples of the preferred material are soda-lime glass, optical glass, silica, silicon, and compound semiconductor such as gallium arsenide. A plastic material may be also used if there is little limitation on temperature characteristic or the like.

A so-called air bridge structure in which only two-dimensional photonic crystal portion is formed without use of any substrate may be adopted.

The method for forming the multilayer film on the substrate is not limited to the sputtering method. For example, a method suitable for film materials, such as a vacuum vapor deposition method, an ion assist vapor deposition method or a CVD method, may be selected.

The groove portions formed may be filled with another medium than air or vacuum. Examples of the filler medium which can be used include an organic resin, a sol-state glass material, and a molten semiconductor material. The sol-state glass may be gelated and then heated to form transparent glass.

When the thickness in the Z-axis direction is as small as possible, the photonic crystal can be produced more easily and both absorption and scattering of propagated light can be reduced preferably. The function of the photonic crystal is however spoiled if the number of periods in the Z-axis direction is extremely small. Accordingly, the number of periods in the Z-axis direction is preferably selected to be in a range of from 3 to 20, both inclusively.

The optical element according to the invention uses a thin-film two-dimensional photonic crystal without necessity of cutting the crystal obliquely. When light is obliquely input into the crystal through a specific end surface of the crystal, the optical element can be provided as an optical element using high wavelength dispersion performance.

What is claimed is:

1. An optical element comprising a two-dimensional photonic crystal structure having structurally periodic repetition in directions of Y and Z axes perpendicular to each other, wherein:

two opposite surfaces of said photonic crystal structure which are perpendicular to the Z-axis direction and parallel to the Y-axis direction are used as a light input surface and a light output surface respectively;

a direction of movement of light rays incident onto said light input surface is parallel to a plane containing said Y and Z axes and inclined at a predetermined inclination angle to the Z-axis direction, wave number vectors belonging to photonic bands according to the direction and frequency of input light are present in said two-dimensional photonic crystal structure; and at least one of said wave number vectors forms an angle of not larger than 30° with respect to a line normal to said light input surface.

2. An optical element according to claim 1, wherein the lowest photonic band is not present in said two-dimensional photonic crystal structure.

3. An optical element according to claim 2, wherein only one photonic band is present in said two-dimensional photonic crystal structure.

4. An optical element comprising a two-dimensional photonic crystal structure having structurally periodic repetition in directions of Y and Z axes perpendicular to each other, wherein:

two opposite surfaces of said photonic crystal structure which are perpendicular to the Z-axis direction and parallel to the Y-axis direction are used as a light input surface and a light output surface respectively; and a direction of movement of light rays incident onto said light input surface is parallel to a plane containing said Y and Z axes and inclined at a predetermined inclination angle to the Z-axis direction, wherein said inclination angle is in a range of from 40° to 70°, both inclusively.

5. An optical element comprising a two-dimensional photonic crystal structure having structurally periodic repetition in directions of Y and Z axes perpendicular to each other, wherein:

two opposite surfaces of said photonic crystal structure which are perpendicular to the Z-axis direction and parallel to the Y-axis direction are used as a light input surface and a light output surface respectively; and a direction of movement of light rays incident onto said light input surface is parallel to a plane containing said Y and Z axes and inclined at a predetermined inclination angle to the Z-axis direction, wherein a ratio $a_2/\lambda_0$ of a period $a_2$ structurally repeated in the Z-axis direction to a wavelength $\lambda_0$ of input light in a vacuum is in a range of from 0.3 to 1.5, both inclusively.

6. An optical element comprising a two-dimensional photonic crystal structure having structurally periodic repetition in directions of Y and Z axes perpendicular to each other, wherein:

two opposite surfaces of said photonic crystal structure which are perpendicular to the Z-axis direction and parallel to the Y-axis direction are used as a light input surface and a light output surface respectively; and a direction of movement of light rays incident onto said light input surface is parallel to a plane containing said Y and Z axes and inclined at a predetermined inclination angle to the Z-axis direction, wherein a ratio of a maximum refractive index to a minimum refractive index between a plurality of substances constituting said two-dimensional photonic crystal structure in the wavelength $\lambda_0$ of input light is in a range of from 1.2 to 5:0, respectively.

7. An optical element according to claim 6, wherein one kind of said plurality of substances constituting a periodic structure portion of said two-dimensional photonic crystal structure is air or vacuum.

8. An optical element comprising a two-dimensional photonic crystal structure having structurally periodic repetition in directions of Y and Z axes perpendicular to each other, wherein:

two opposite surfaces of said photonic crystal structure which are perpendicular to the Z-axis direction and parallel to the Y-axis direction are used as a light input surface and a light output surface respectively; and a direction of movement of light rays incident onto said light input surface is parallel to a plane containing said Y and Z axes and inclined at a predetermined inclination angle to the Z-axis direction;

said two-dimensional photonic crystal structure is made of a periodic multilayer film formed on a surface of a parallel plane substrate; and parallel grooves each having a predetermined width are formed in said multilayer film so that said parallel grooves are disposed at regular intervals.

9. A spectroscopic device comprising:

an optical element constituted by a multilayer structure, said optical element comprising (i) a two-dimensional photonic crystal structure having structurally periodic repetition in directions of Y and Z axes perpendicular to each other, wherein (ii) two opposite surfaces of said photonic crystal structure which are perpendicular to the Z-axis direction and parallel to the Y-axis direction are used as a light input surface and a light output surface respectively; and (iii) a direction of movement of light rays incident onto said light input surface is parallel to a plane containing said Y and Z axes and inclined at a predetermined inclination angle to the Z-axis direction, a unit for inputting multiplexed light flux with a plurality of wavelengths into an end surface of a periodic structural portion of said multilayer structure; and a unit for detecting light rays output from a light output surface of said multilayer structure at angles different in accordance with the wavelengths.

* * * * *